United States Patent
Fukushima et al.

(10) Patent No.: US 6,690,627 B2
(45) Date of Patent: *Feb. 10, 2004

(54) SYSTEM FOR REPRODUCING A RECORDED DISC

(75) Inventors: Yoshimitsu Fukushima, Saitama-ken (JP); Yuji Ikedo, Saitama-ken (JP); Hiroyuki Watanabe, Saitama-ken (JP); Hitoshi Nagata, Saitama-ken (JP); Atsushi Yamane, Saitama-ken (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 29 days.

(21) Appl. No.: 09/190,600

(22) Filed: Nov. 12, 1998

(65) Prior Publication Data

US 2002/0012294 A1 Jan. 31, 2002

(30) Foreign Application Priority Data

Nov. 27, 1997 (JP) .............................. 9-326099
Jun. 9, 1998 (JP) .......................... 10-161062

(51) Int. Cl.[7] .................. G11B 21/08; G11B 7/085
(52) U.S. Cl. ................................. 369/30.86
(58) Field of Search ............... 369/36, 37, 191, 369/192, 30.86, 30.85, 30.76, 30.64, 30.38, 30.03, 30.01, 24.01, 178.01; 360/92

(56) References Cited

U.S. PATENT DOCUMENTS

| | | | | |
|---|---|---|---|---|
| 4,253,125 A | | 2/1981 | Kanamuller | 360/98.05 |
| 4,996,680 A | * | 2/1991 | Staar | 360/98.04 |
| 5,214,628 A | * | 5/1993 | Langman et al. | 369/30.86 |
| 5,504,723 A | * | 4/1996 | Ross | 369/30.86 |
| 5,541,896 A | * | 7/1996 | Ashby | 369/30.77 |
| 5,577,010 A | * | 11/1996 | Haque | 369/30.3 |
| 5,757,739 A | * | 5/1998 | Heath et al. | 369/30.33 |
| 5,777,958 A | * | 7/1998 | Matumoto et al. | 369/30.86 |
| 5,953,293 A | * | 9/1999 | Kajiyama et al. | 369/31.01 |
| 5,959,958 A | | 9/1999 | Inatani et al. | 369/30.85 |
| 5,978,323 A | * | 11/1999 | Nakamura et al. | 369/30.85 |
| 6,084,833 A | * | 7/2000 | Ohkawara et al. | 369/30.89 |

FOREIGN PATENT DOCUMENTS

| | | |
|---|---|---|
| EP | 0 519 069 A1 | 12/1992 |
| EP | 0 614 183 A2 | 9/1994 |
| JP | 59-104759 | 6/1984 |
| JP | 9-223351 | 8/1997 |
| JP | 10027408 | 1/1998 |
| WO | WO 87/07423 | 12/1987 |
| WO | 8707423 | * 12/1987 |

* cited by examiner

*Primary Examiner*—Julie Anne Watko
(74) *Attorney, Agent, or Firm*—Arent Fox Kintner Plotkin & Kahn, PLLC

(57) ABSTRACT

A disc holder is annularly provided for holding a plurality of discs, and a reproducing device is provided in a central portion of the disc holder for reproducing a desired disc. A carrying device is provided for carrying the desired disc between the disc holder and the reproducing device. The carrying device has a groove for slidably engaging with a peripheral portion of the desired disc, and a pair of inclined surfaces for separating adjacent discs on both sides of the desired disc from the desired disc.

11 Claims, 26 Drawing Sheets

SYSTEM FOR REPRODUCING A RECORDED DISC

BACKGROUND OF THE INVENTION

The present invention relates to a system for reproducing a disc.

A disc reproducing system having an automatic disc changer has recently become popular. The disc reproducing system is provided with a rack wherein a large number of CDs are stored so as to improve the storing efficiency of the CDs.

FIG. 25 is a perspective view of such a reproducing system disclosed in Japanese Patent Laid Open 9-223351 which has been filed by the present patent applicant.

FIGS. 26 and 27 show another reproducing system disclosed in Japanese Patent Laid Open 59-104759.

The system of FIG. 25 will be described firstly. A disc reproducing system is provided with a roulette device 3 mounted on a chassis base 2 in a housing. The housing comprises the chassis base 2, casing 8, rear panel 9 and the front operation panel 10. The roulette device 3 comprises a base 3a, rack base 3b having a spindle 3c and a center pole 5 mounted on the spindle 3c, and five rotary circular racks 4a, 4b, 4c, 4d and 4e, each having a center hole 4 in which the center pole 5 is engaged. Hence, all of the racks 4a to 4e are securely mounted on the center pole 5 in a tiered formation.

In each of the racks 4a to 4e, there is formed radial slits 40 in each of which a recording medium D such as CD can be stored. A radial recess 41 through which a disc player 7 provided adjacent the racks 4a to 4e passes is further formed in each of the racks 4a to 4e at a predetermined circumferential position. In the player 7, an arm 7a is provided for taking out one of recording mediums D. The arm 7a is operated by a driving device (not shown) upon loading and ejecting of the recording mediums D into and out of the disc player 7 thereby passing through one of the slits 40 of the rack from the underneath thereof.

The front operation panel 10 is provided with an opening 10a through which the recording mediums D is inserted and taken out. The opening 10a is covered by a door 6 having a pin 6a projected downward from the top. The pin 6a engaged with the upper end of the center pole 5 so that the door 6 is rotatably mounted thereon. The door 6 is rotated on the pole 5 in the counterclockwise direction to disclose the racks 4a to 4e through the opening 10a.

On the underside of the rack 4a, an encoder (not shown) and photo sensors are provided for detecting position of a desired recording mediums on one of the racks 4a to 4e.

When a select button on the operation panel 10 is operated to select a desired recording mediums, the racks 4a to 4e are rotated and stored at an angular position where the desired recording medium is stored. The disc player 7 is vertically moved to the position of one of racks where the recording medium is stored. The arm 7a takes out the recording medium and loads it on the disc player 7, thereby reproducing the recording medium.

Referring to FIGS. 26 and 27, an annular storing base 12 is rotatably provided in a frame 11 and rotated by a rotating device 13. On the storing base 12, a plurality of recording mediums D are stored. An information reading and writing device 15 and an arm driving device 17 for driving an arm 16 are mounted on a holding base 14. A guide 15a is provided for guiding the recording medium D. An opening 18 is formed for inserting the recording medium D. The arm 16 has pawls 16a and is driven by a screw 19.

When a desired recording medium D is selected, the storing base 12 is rotated so that the selected recording medium is positioned at the opening 18 of the information reading and writing device 15. Then, the arm 16 is moved in the direction X by the arm driving device 17, and inserts the recording medium D into the device 15. The recording medium D is located at a position d shown by dotted lines. At the position, the information is read and written.

Thereafter, the information reading and writing device 15 moves the recording medium D to a position where a part of recording medium D is projected from the opening 18.

A detector (not shown) mounted on the arm 16 detects whether the recording medium D contacts with the arm 16 or not. If contacts, the pawls 16a are moved in the direction Y in FIG. 27 by solenoids (not shown) to grip the recording medium D. If does not contact, the arm 16 is moved in the direction X until contacts. Then, the arm 16 is moved in the direction X' so that the recording medium D is returned to the storing base 12, and hence the sequential operation is completed.

In the former reproducing system, in order to increase the storing quantity of the recording medium D on the racks 4a to 4e, the number of the racks must be increased, or the diameter of each rack must be increased. However either of the methods increases the system in size which renders the manufacturing cost to be increased.

In addition, when the arm 7a of the player 7 loads and unloads the recording medium D, the arm 7a may slide on the adjacent recording medium D, which causes the recording surface of the medium to be damaged.

In the case of the increasing of storing density of the medium, the problem of damaging adjacent medium D further increases.

In the latter reproducing system, in order to increase the storing quantity of the recording medium D, the diameter of the storing base 12 must be increased. However, such an improvement increases the system in size, which accompanies by increasing of the manufacturing cost.

Furthermore, when the arm 16 of the arm driving device 17 inserts a medium D in the opening 18, the arm 16 slides on the adjacent medium D, thereby damaging the recording surface of the adjacent disc D.

In addition, in the system, the pawls 16a grip the disc, when returning. However, there is a problem that the pawls may damage recording surfaces of the returned disc and on adjacent disc.

SUMMARY OF THE INVENTION

An object of the present invention is to provide a system for reproducing recording mediums which may carry a desired recording medium without damaging the recording medium and an adjacent recording medium.

Another object of the present invention is to provide a recording medium reproducing system which is improved to increase the storing efficiency.

According to the present invention, there is provided a system for reproducing a recorded disc comprising, a disc holder for holding a plurality of discs, a reproducing device for reproducing a desired disc, carrying means for carrying the desired disc between the disc holder and the reproducing device, a groove provided on the carrying means for slidably engaging with a peripheral portion of the desired disc, and a pair of inclined surfaces provided on the carrying means for separating adjacent discs on both sides of the desired disc from the desired disc.

Each of the inclined surfaces is provided to be moved along the peripheral portion of the adjacent disc.

These and other objects and features of the present invention will become more apparent from the following detailed description with reference to the accompanying drawings.

DETAILED DESCRIPTION OF THE PREFERRED EMBODIMENT

The first embodiment of the present invention will be described with reference to FIGS. 1 to 5.

An annular disc holder 120 is rotatably mounted on a rack base 110 in a housing 100. The disc holder 120 is provided with an information recording medium (hereinafter called disc) storing portion having a semicircular cross section, which has a plurality of radially arranged storing slits 121, each having a peripheral opening having a curvature equal to that of the disc D.

Figure 2:
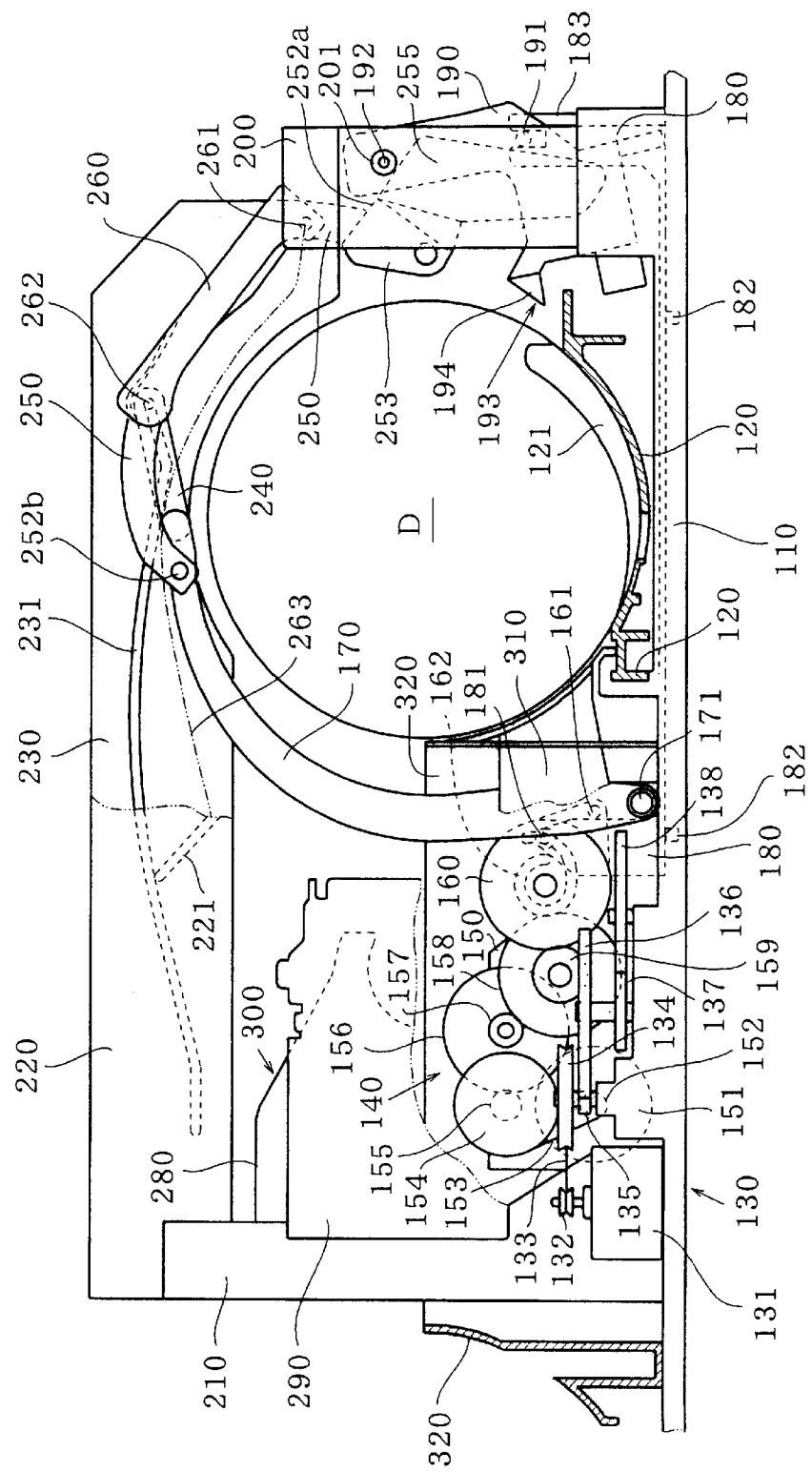
FIG. 2 is a side view of the device.
Figure 3:
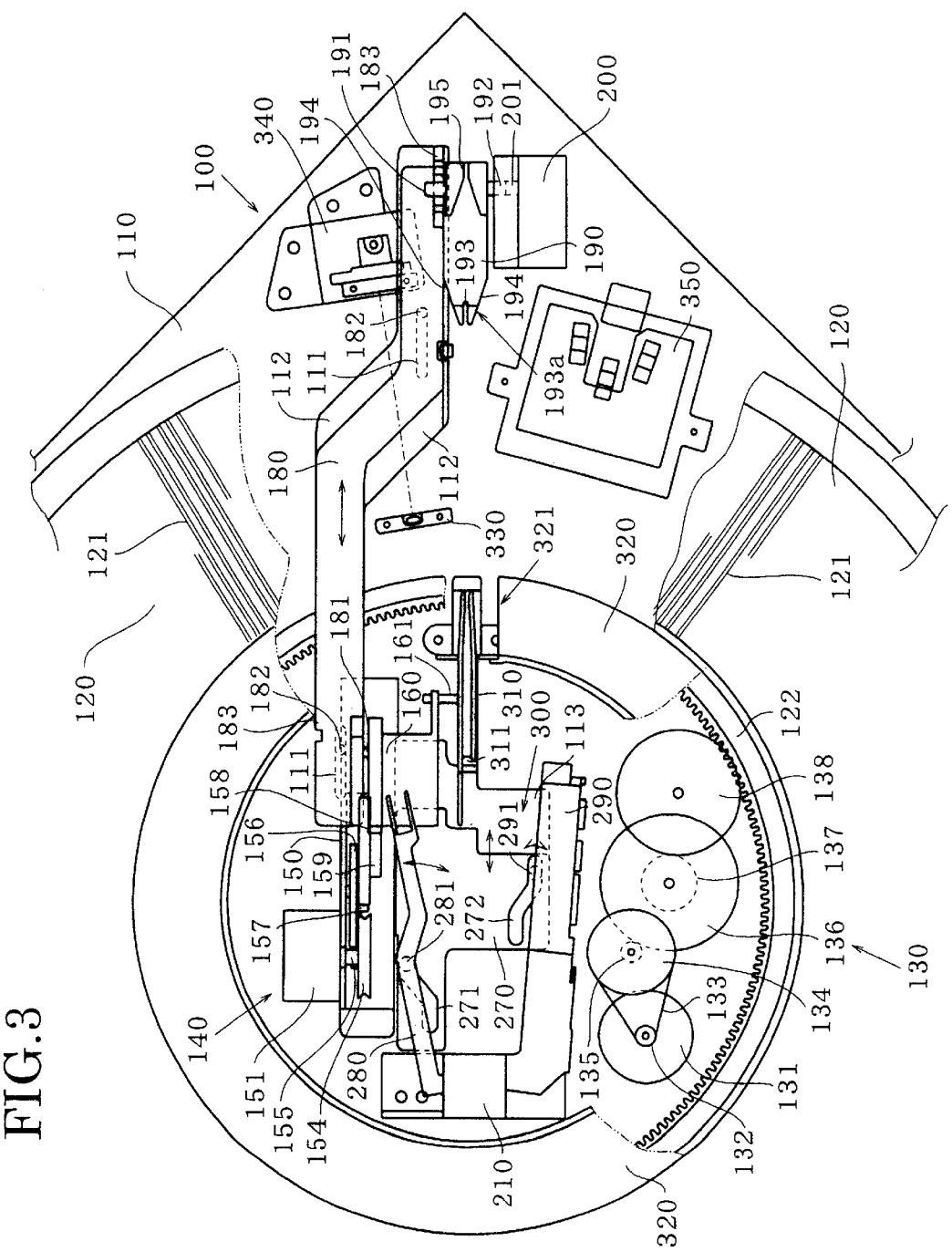
FIG. 3 is a plan view showing a part of the device.

As shown in FIGS. 2 and 3, a rack driving device 130 is provided on the rack base at a central portion of the rack holder 120. The rack driving device 130 has a driving motor 131. Securely mounted on a output shaft of the motor 130 is a pulley 132 which is connected to a pulley 134 by a V-belt 133. A pinion 135 coaxial with pulley 134 engages with a reduction gear 136 rotatably mounted on the rack base 110. A pinion 137 on the shaft of the gear 136 engages with a driving gear 138 rotatably mounted on the rack base 110. The driving gear 138 engages with a rack 122 formed on an inner periphery of the disc holder 120.

A gear driving device 140 having a disc loading is provided on a central portion of the disc holder 120, as a loading device of the disc D. A disc reproducing device 300 having a loading motor 151 is provided adjacent the driving device 140, as a driving source of a driving arm 170. A pulley 152 on the shaft of the loading motor 151 is connected to a pulley 154 held on a gear holder 150 by a V-belt 153. A pinion 155 on the shaft of the pulley 154 is engaged with a reduction gear 156, and a pinion 157 coaxial with the gear 156 is engaged with a reduction gear 158. A pinion 169 coaxial with the gear 158 meshes with a circular driving cam 160.

A pin 161 provided on a side of the cam 160 is engaged with a cam groove 172 (FIGS. 15a–e) provided on a base portion of the arm 170 rotatably mounted by a shaft 171 so as to rotate the arm 170. A cam groove 162 formed on the other side of the cam 160 is engaged with a guide pin 181 provided on a slide plate 180 so as to reciprocate the slide plate 180.

As shown in FIG. 3, the slide plate 180 is mounted on the rack base 110 underside of the disc holder 120. A pair of guide pins 182 projected from the underside of the slide plate 180 are slidably engaged with guide grooves 111, so that the slide plate 180 is slid in a groove 112.

On the other side of the slide plate 180, a vertical recess 183 is formed for controlling a pressure plate 190. On the one of the sides, a guide pin 191 is provided to be engaged with the recess 183.

A guide pin 192 mounted on the pressure plate 190 and projected in the opposite direction to the guide pin 191 is engaged in a hole 201 of a holding plate 200 (hereinafter described). When the slide plate is reciprocated, the pressure plate 190 is partially rotated about the guide pin 192.

A V-shaped end 193a (FIG. 3) is formed on the pressure plate 190, and a gripping groove 193 is formed for gripping a desired disc D, and inclined side faces 194 are also formed so that the side faces 194 are inserted into the gaps between the desired disc D and adjacent discs D', thereby increasing the gap in the circumferential direction of the disc holder 120.

In addition, the pressure plate 190 has a guide groove 195 in which a guide portion 255 (FIG. 4) of a carrier arm 250 is adapted to be engaged.

On the other hand, a cramp post 210 is mounted on a central position of the disc holder 120, and a pusher plate holding base 200 (FIG. 2) is mounted on the rack base 110 outside the disc holder 120. Mounted on upper portions of the cramp post 210 and of the holding base 200, is a pair of guides 220(L) and 230(R) over the disc holder 120 (FIG. 2).

Figure 1:
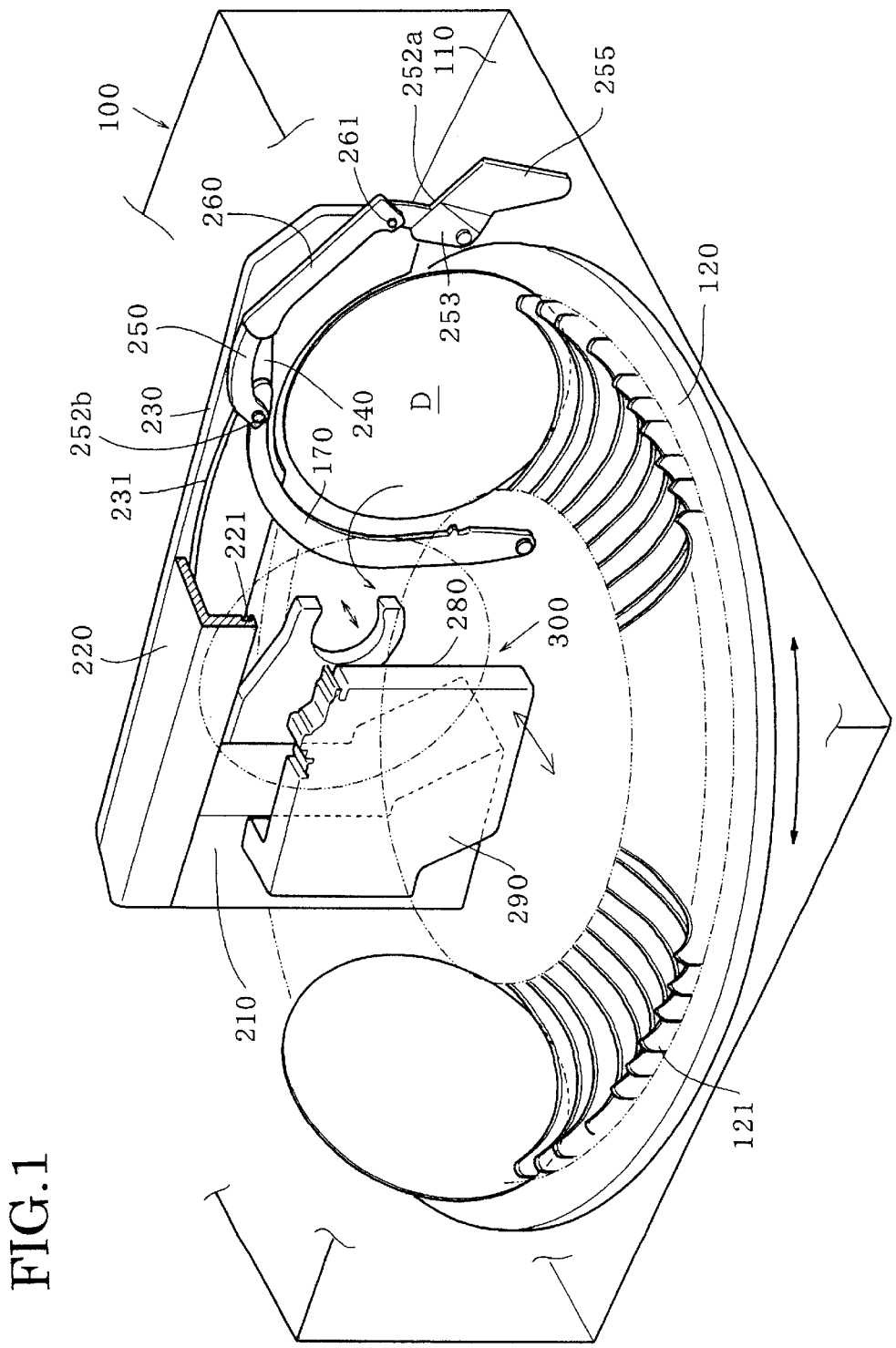
FIG. 1 is a perspective view of a reproducing device to which the present invention is applied, as a first embodiment.
Figure 4:
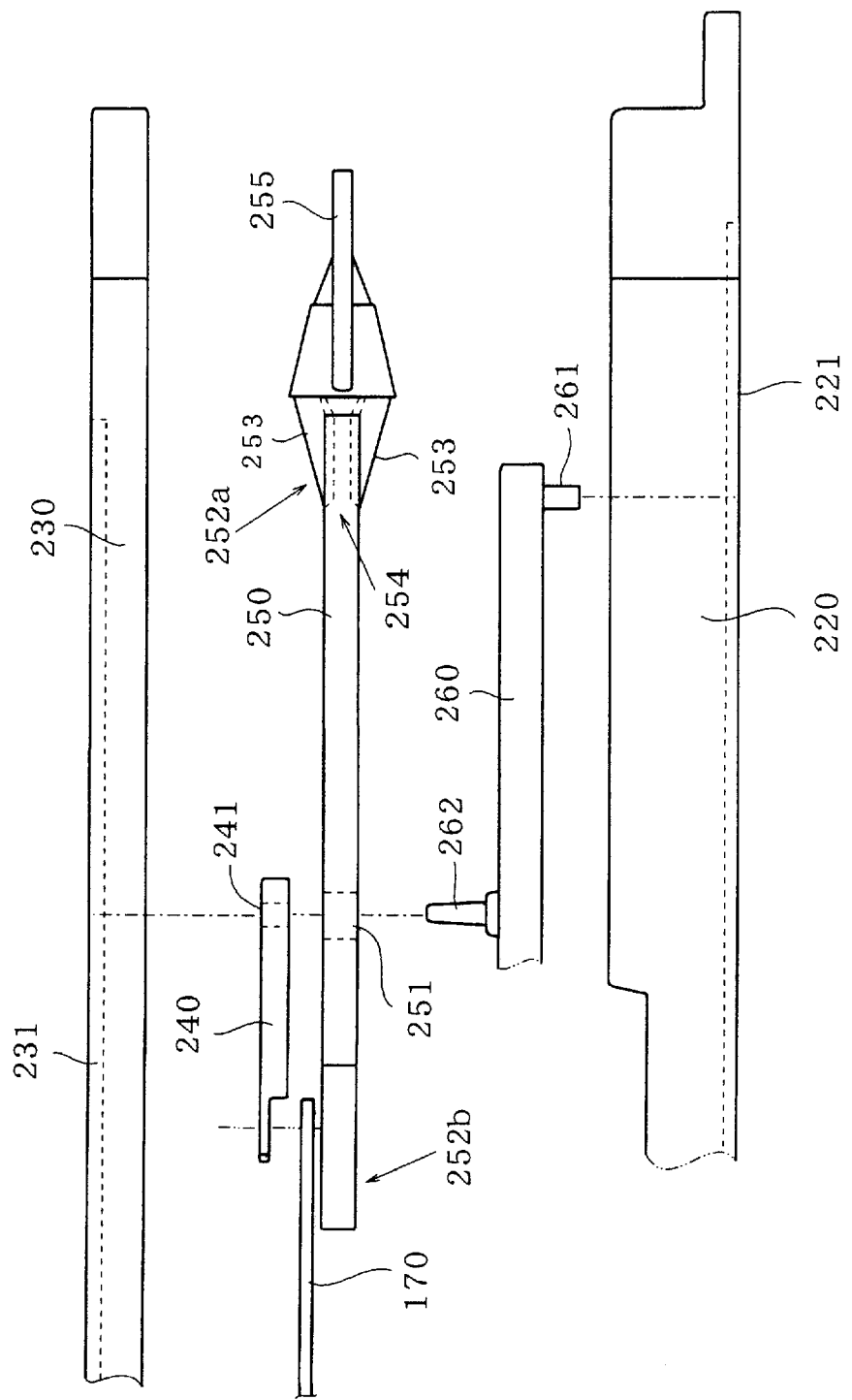
FIG. 4 is a plan view showing a carrying device.

As shown in FIGS. 1 and 4, the guide 220 has a guide groove 221 at the inside wall thereof. In the guide groove 221, a guide pin 261 of a guide arm 260 is slidably engaged. A guide groove 231 is formed on the guide 230 opposite to the guide groove 221.

On the other hand, the guide arm 260 has a guide pin 262 which passes through a hole 251 of a carry arm 250 and a hole 241 of an intermediate arm 240, and is slidably engaged with the guide groove 231. The intermediate arm 240 is connected to an end of the driving arm 170.

The carry arm 250 has engaging portions 252a and 252b at both ends thereof. The engaging portion 252a has inclined side faces 253 which slidably engage only with the peripheral edges of the adjacent discs D' adjacent to the desired disc to separate the adjacent discs D' on both sides of the desired disc D and a groove 254 slidably engaged with the peripheral edge of the desired disc D. (FIG. 4)

The engaging portions 252a and 252b of the carry arm 250 hold the disc D, and takes out it from the disc holder, and carry it to the disc reproducing device 300.

Figure 5:
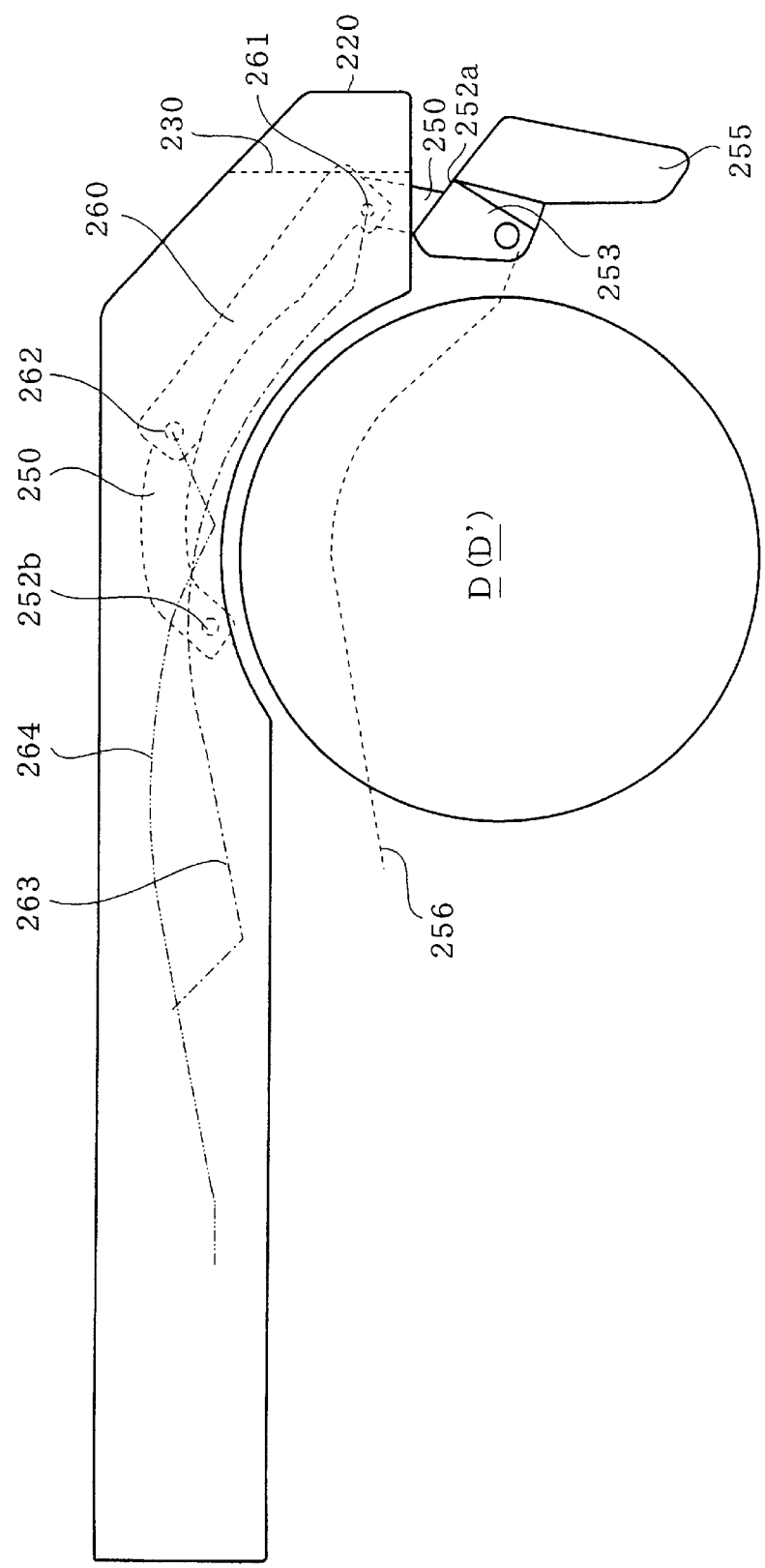
FIG. 5 is a side view of the carrying device.

On the end of the carry arm 250, a guide portion 255 is provided for positioning the disc. The guide portion 255 is shaped into a tin flat plate (FIGS. 4 and 5). Before the disc D is carried to the reproducing device 300, the guide portion 255 is inserted in the guide groove 195 of the pressure plate 190 (FIG. 3). As a result, the carry arm 250 is exactly positioned. Therefore, the engaging portions 252a and 252b are accurately engaged with the disc D on the disc holder 120.

Referring to FIG. 5, a dot-dash line 263 indicates a passage when the guide pin 261 at the end of the arm 260 is moved along the guide groove 221 (FIG. 1). A dot-dash line 264 indicates a passage when the pin 262 is moved along the guide groove 231 (FIG. 6) of the guide 230. A doted line 256 shows a passage of the engaging portion 252a of the arm 250 when the arm 260 is moved along the guide grooves 221 and 231 of the guides 220 and 230. The passage 256 are shaped so as to move along a peripheral portion of each of the adjacent discs D'.

As shown in FIG. 3, a driving cam 270 is slidably engaged with a groove 113 of the rack base 110 at a central portion of the disc holder 120 so as to be reciprocated in the groove 113. The driving cam 270 is driven by the motor 151.

On the driving cam 270, a pair of guide grooves 271 and 272 are formed for operating a clamper holder 280 and a servo device 290 of reproducing device 300.

Guide pins 281 and 291 provided underside of the clamper holder 280 and servo device 290 which are pivotally mounted on the clamper post 210 are slidably engaged with the guide grooves 271 and 272 of the cam 270. Thus, the clamper holder 280 and servo device 290 are swayed when the cam 270 is reciprocated. On the servo device 290, a pickup, spindle motor and others are mounted.

Furthermore, on the rack base 110, a disc guide 310 and an annular cover 320 are provided. The cover 320 has a recess 321 engaged with the disc guide 310.

Figure 6:
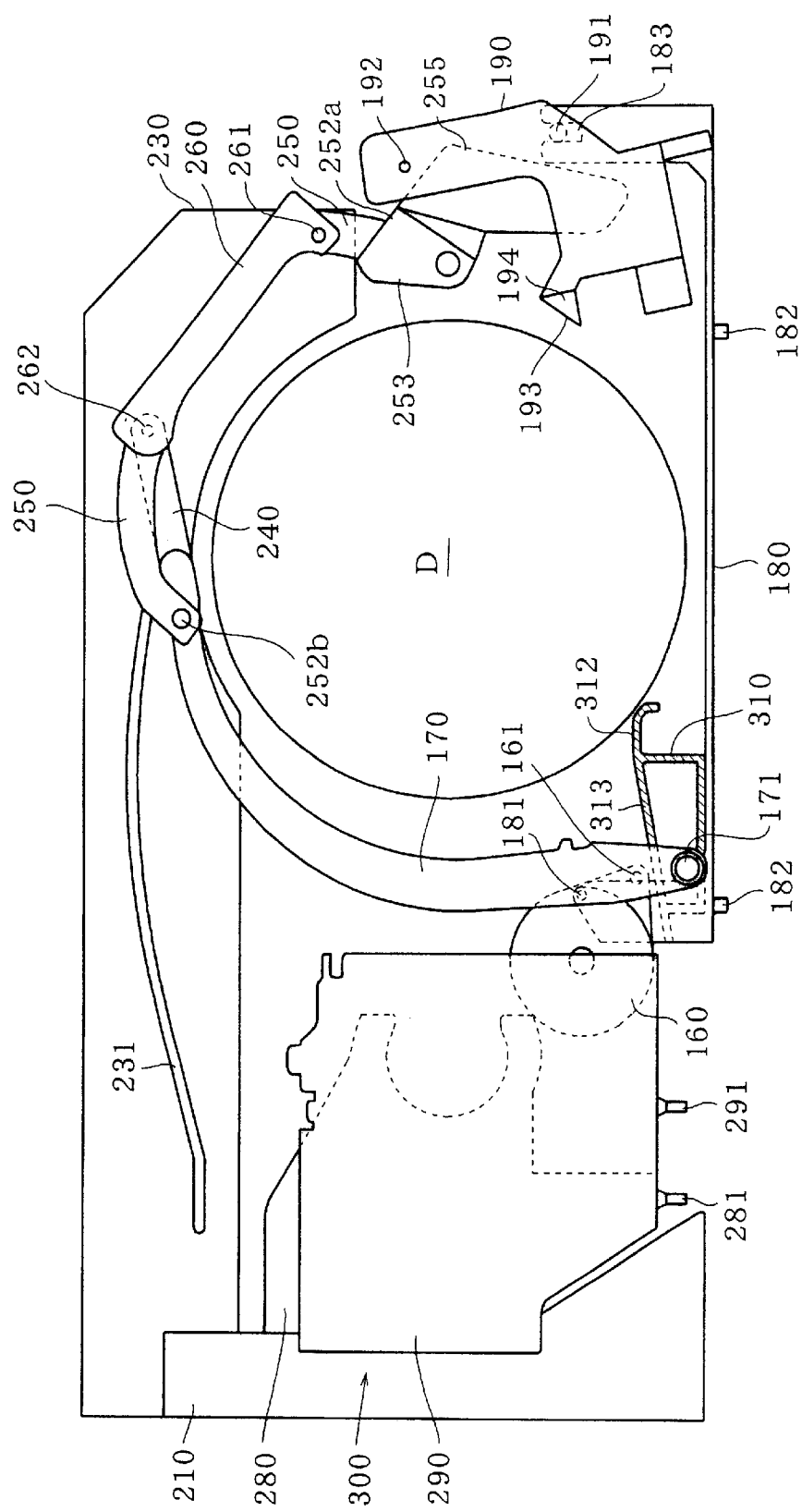
FIGS. 6 to 14 are side views showing operation of the carrying device.

The disc guide 310 is provided for guiding the disc D. To this end, the disc guide 310 has a groove 311, a bottom 312 of which is adapted to be engaged with the disc D (FIG. 6). Adjacent the bottom 312, an inclined portion 313 is formed.

Referring to FIG. 3, a sensor holder 330 and a sensor stay 340 are oppositely mounted on the base 110 so as to optically detect the disc D. Further, a sensor 350 is provided for detecting the address of the disc holder 120.

The operation of the device will be described hereinafter with reference to FIGS. 6 to 15.

FIG. 6 shows an unloading state of the disc D where the driving arm 170 and the guide arm 260 are located at right end positions. Furthermore, the slide plate 180 is also located at a right end position.

Figure 12:
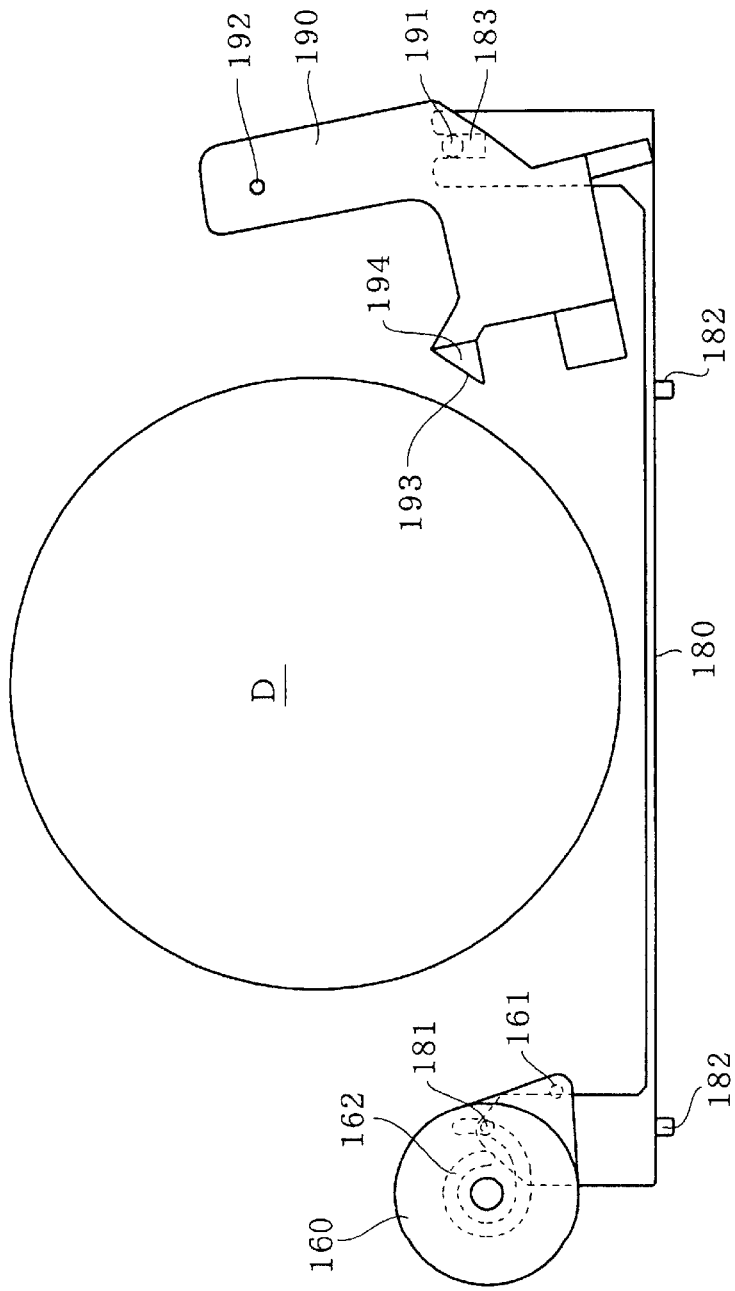

When selection of a desired disc is instructed from an operating panel (not shown), the motor 131 (FIG. 3) is operated to rotate the rack 122 through the gear train comprising gears 134, 135, 136, 137 and 138, thereby rotating the disc holder 120. When the address detecting sensor 350 detects that the desired disc D is located at the front position of the reproducing device 300, the disc holder 120 is stopped. Then the motor 151 (FIG. 3) is operated to drive the gear driving section 140, so that the driving cam 160 is rotated in the counterclockwise direction. The rotation of the driving cam 160 causes the slide plate 180 to slide to the left by engagement of the pin 181 of the slide plate 180 with the cam groove 162 of the cam 160. Accordingly, the pin 191 engaged with the recess 183 of the slide plate 180 is moved to the left, so that the pressure plate 190 is rotated in the clockwise direction about the pin 192 (FIG. 12).

Figure 13:
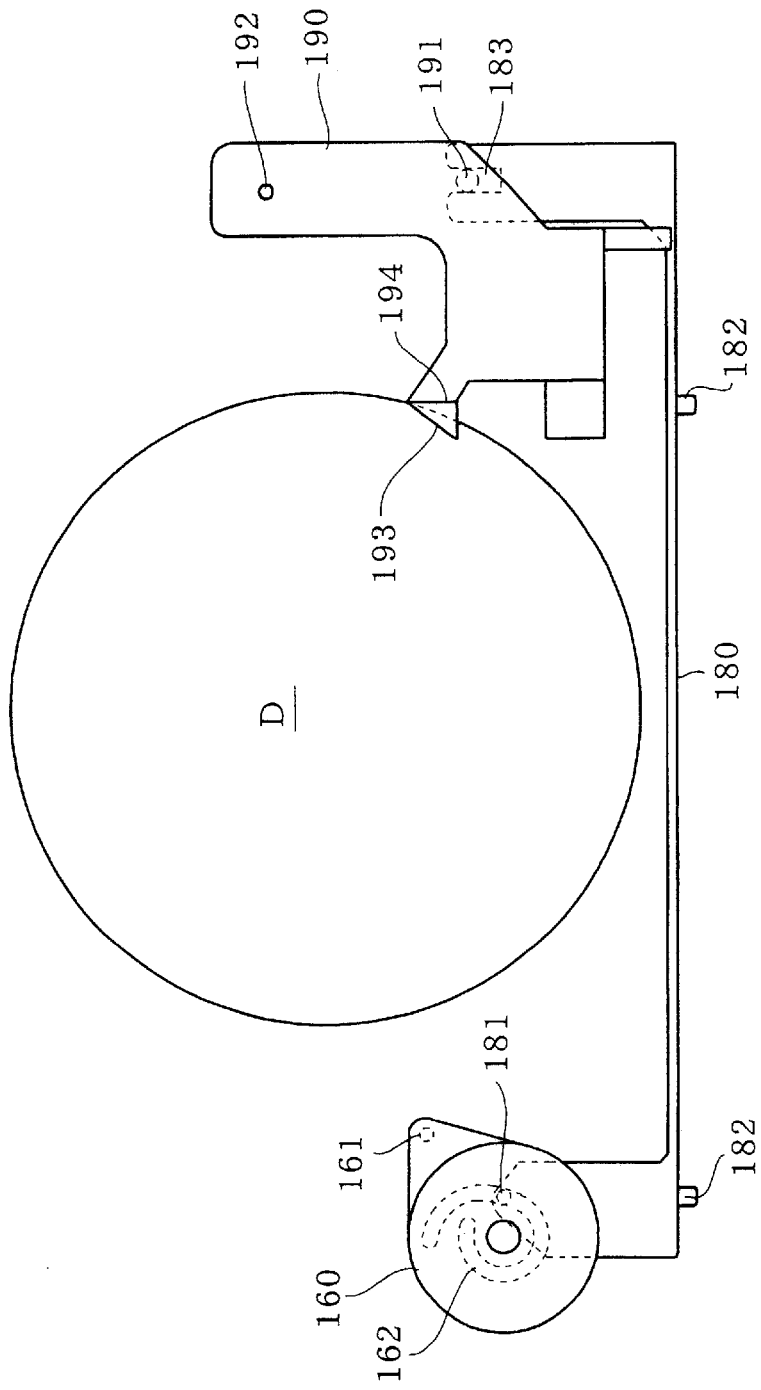
Figure 14:
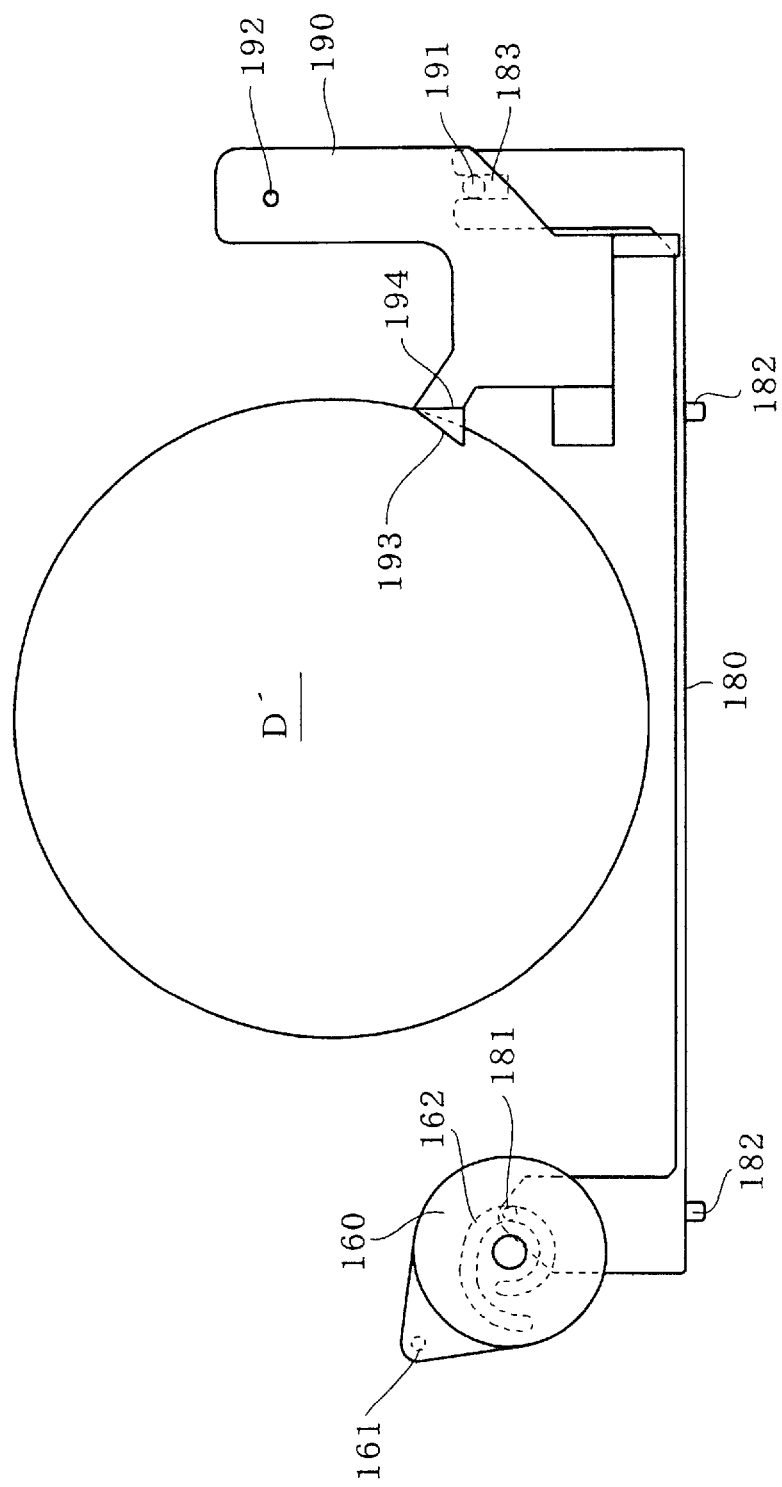
Figure 15:
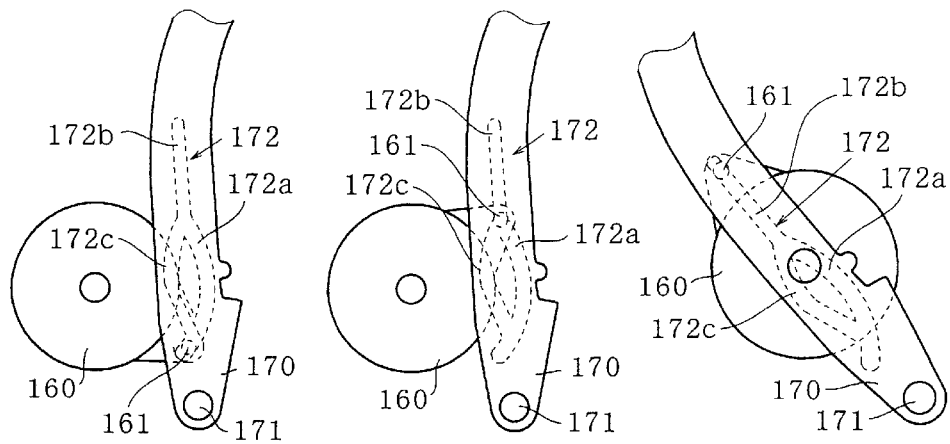
FIGS. 15a to 15e are side views showing operation of a base portion of the carrying device.
Figure 15:
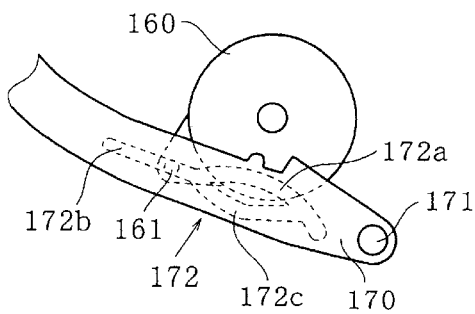
Figure 15:
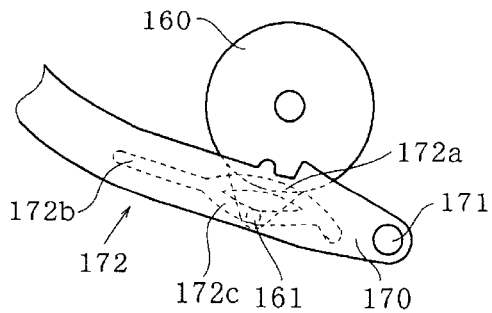
Figure 16:
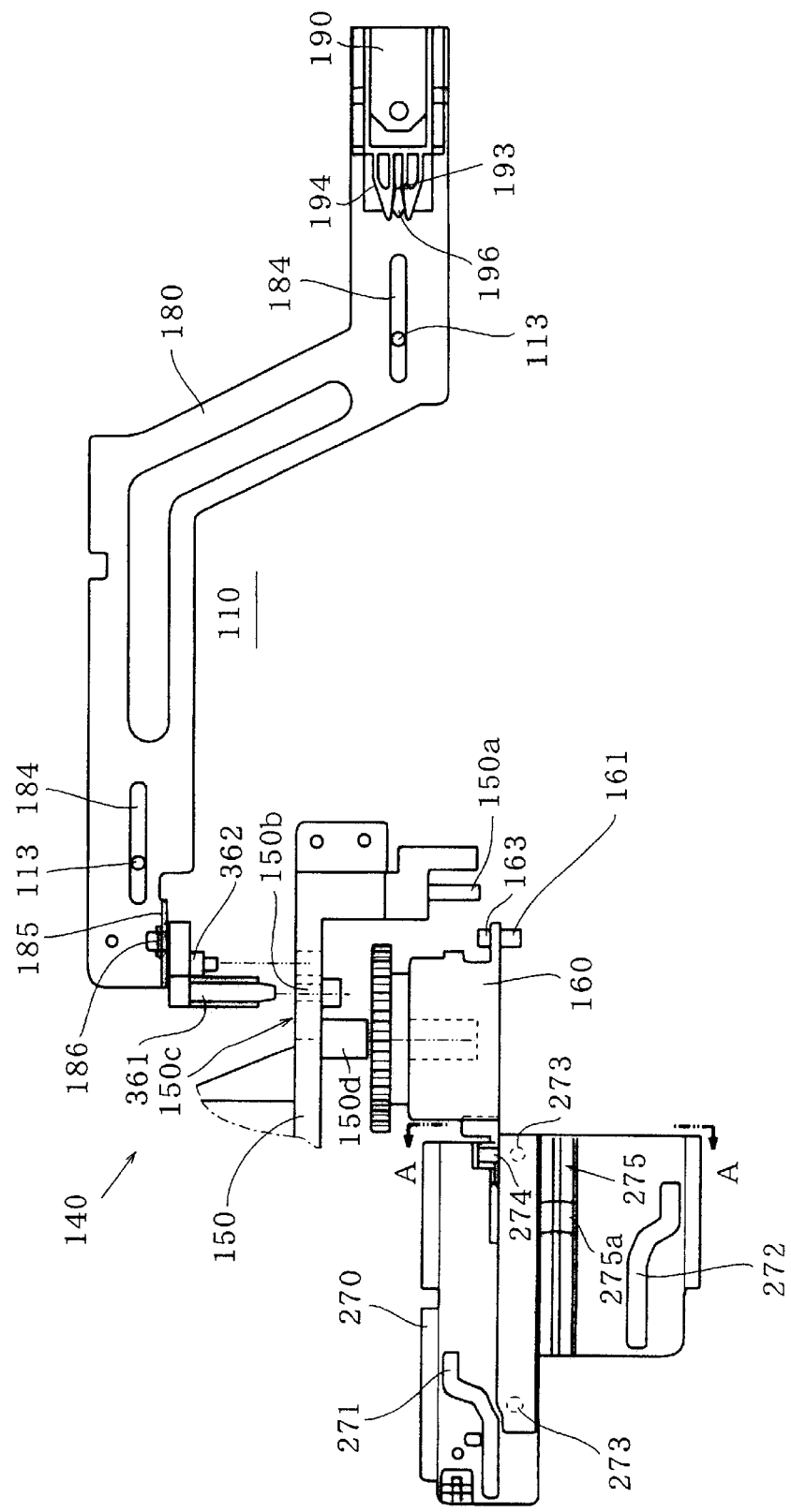
FIG. 16 is a plan view of a part of a second embodiment of the present invention.
Figure 17:
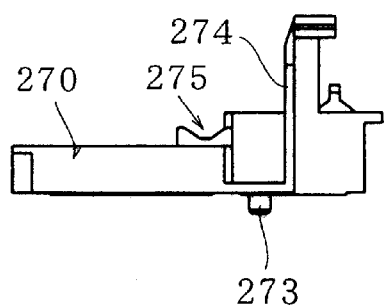
FIG. 17 is a side view of a part of a carrying device.

As shown in FIG. 13, the groove 193 of the push plate 190 is engaged with a peripheral portion of the desired disc D, and the inclined side faces 194 engage with discs D' at both sides of the desired disc D to push the discs D'. Thus, the spaces between the disc D and both side discs D' are expanded.

At that time, a part of the push plate 190 engages with a part of the disc holder 120 to securely hold the disc holder to prevent the disc holder 120 from vibrating during the operation.

In such a condition, the slide plate 180 is kept at the position of FIG. 13 due to the shape of the cam groove 162.

During the above described operation the cam 160 rotates from the position of FIG. 15a to the position FIG. 15b. However, since a part 172a of the cam groove 172 has a circular shape on the same circle as the circle on which the pin 161 on the cam 160, the arm 170 does not rotate.

When the cam 160 further rotates, the pin 161 enters a straight portion 172b as shown in FIG. 15c. Therefore, the arm 170 is started to rotate about the shaft 171 in the counterclockwise direction as shown is FIGS. 8 and 15c.

The rotating arm 170 actuates the guide 260 and the carry arm 250 through the intermediate arm 240. Namely, the pin 261 of the arm 260 moves along the guide groove 221 of the guide 220, and the pin 262 of the arm 260 moves along the guide groove 231 of the guide 230.

Figure 8:
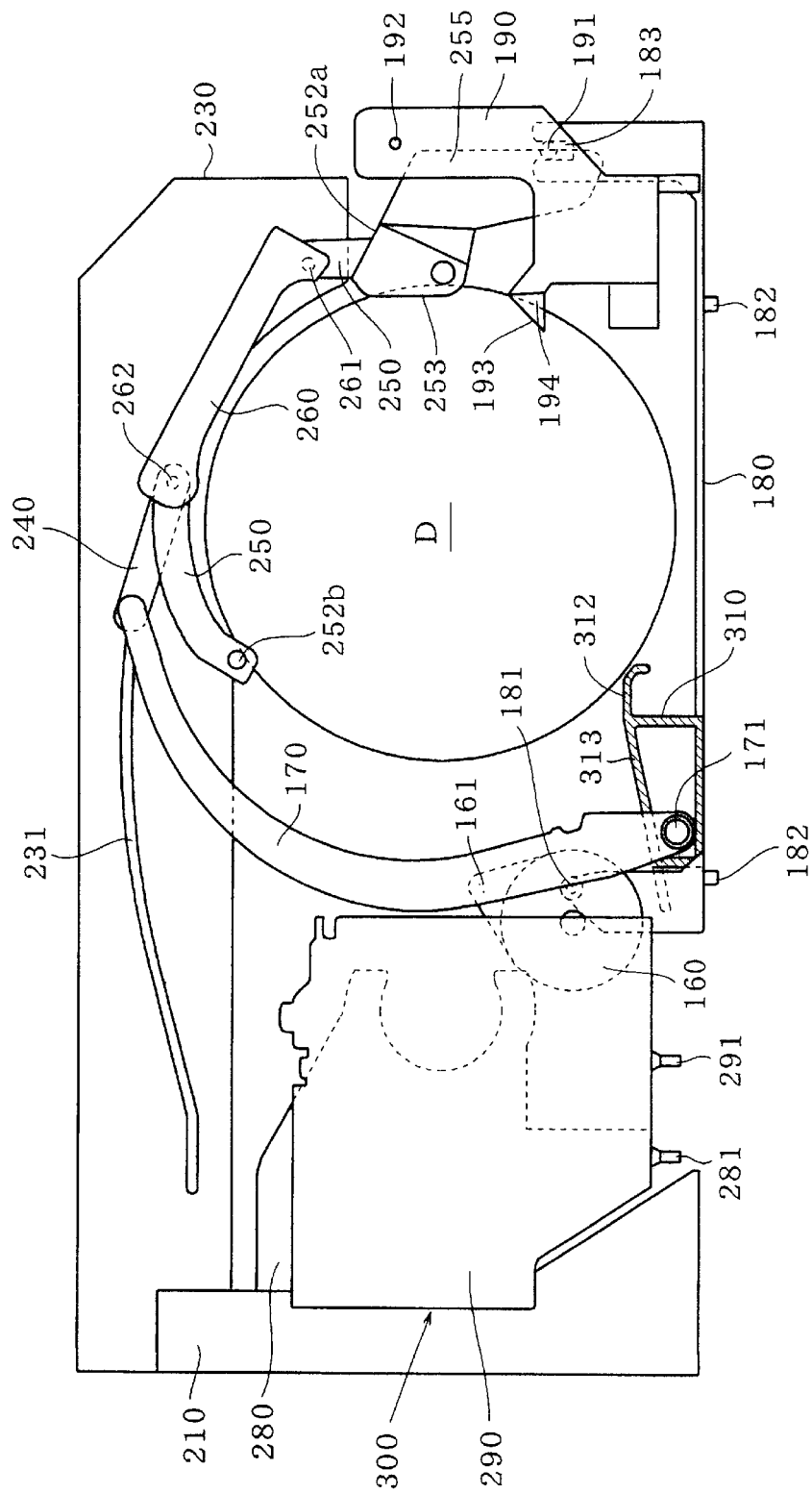
Figure 9:
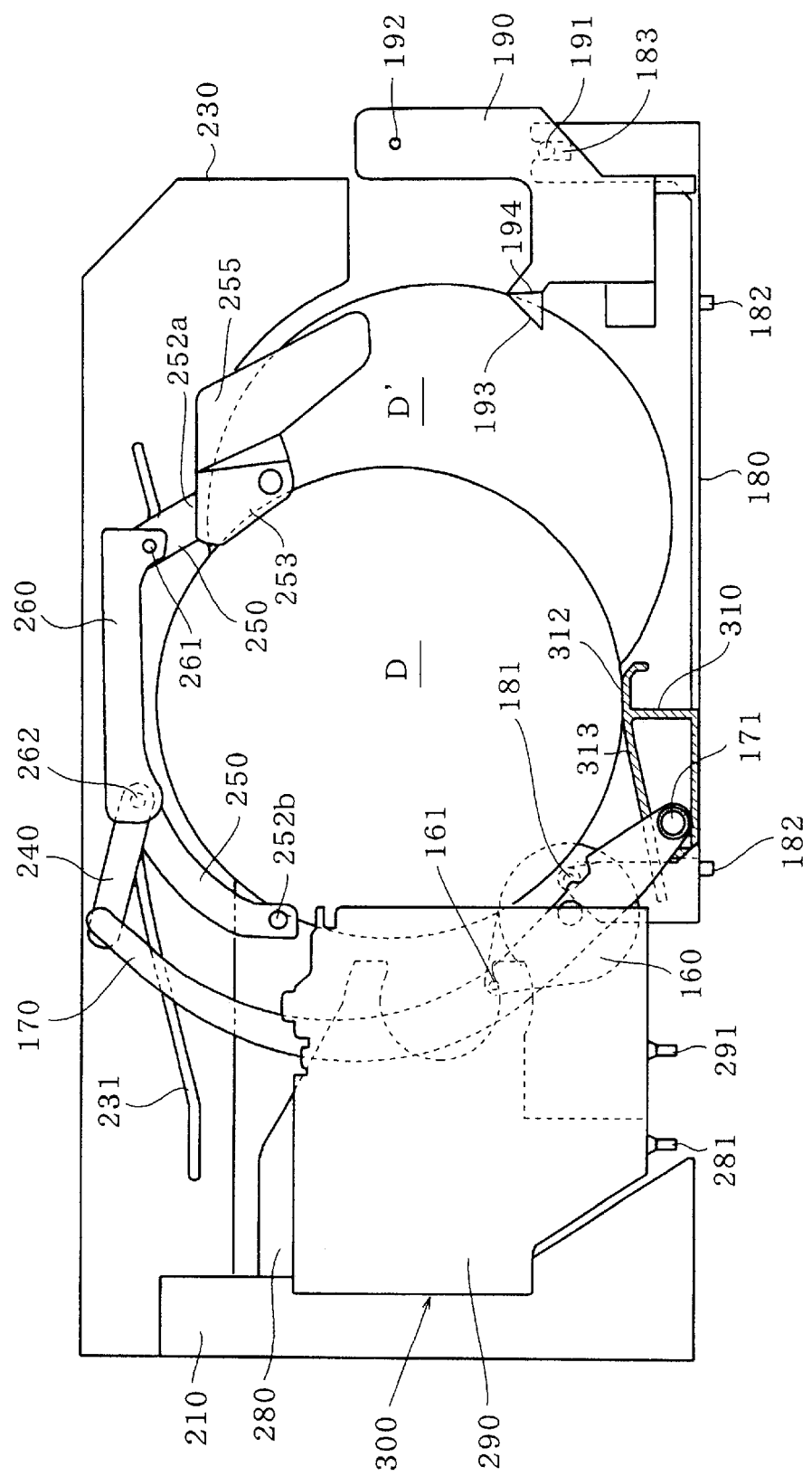
Figure 10:
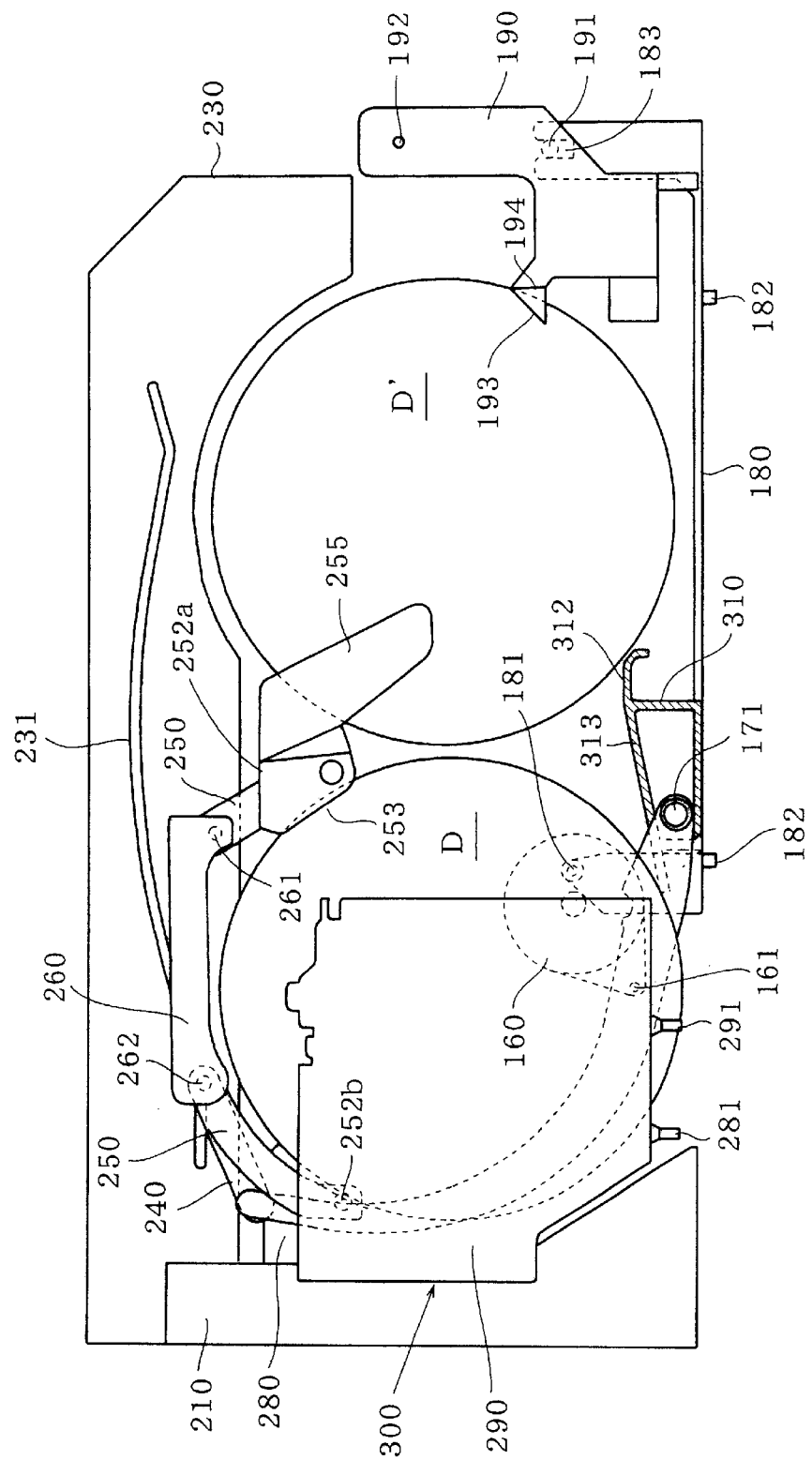

In the condition that discs D' on the both sides of the desired disc D are spaced from the disc D, the groove 254 of the engaging portions 252a and 252b of the carrying arm 250 are slidably engaged with the peripheral portion of the desired disc D as shown in FIG. 8. The inclined portions 253 of the arm 250 are inserted in the spaces between the discs D and D' to further expand the space there-between. Further the disc D is removed from the disc holder 120 as shown in FIG. 9. The disc D is inserted in the groove 311 (FIG. 3), rolling the disc D on the bottom 312 and the inclined portion 313. Thus, the disc D is loaded on the reproducing device 300 as shown in FIG. 10.

Figure 11:
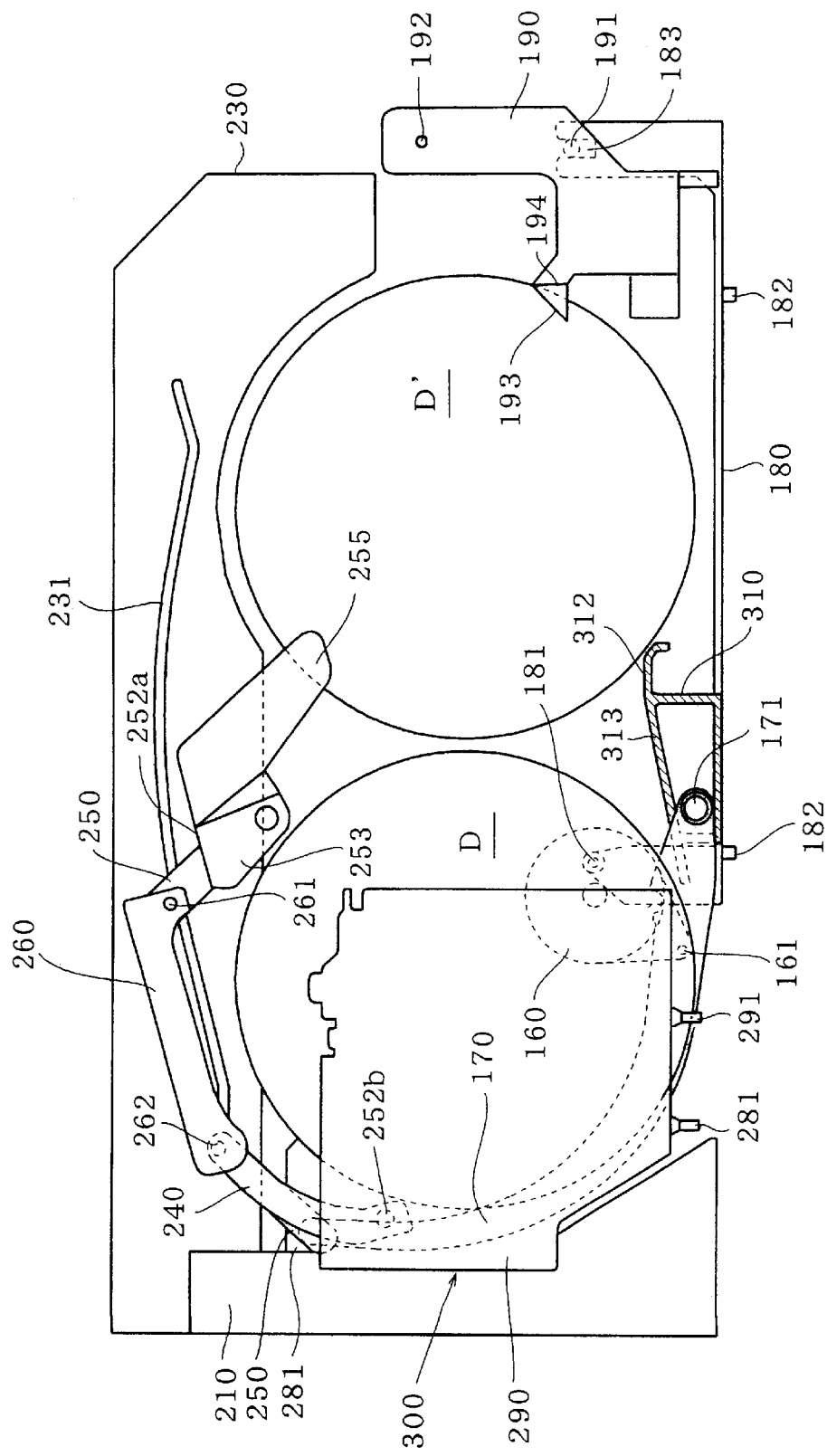

At that time, the pin 161 is still engaged with the straight portion 172b as shown in FIG. 15d. The pin 161 is further rotated in a groove 172c (FIG. 15e) to move the arm 170. Thus, as shown in FIG. 11, the engaging portions 252a and 252b of the carrying arm 250 are removed from disc D. On the other hand, the guide portion 255 is still inserted between the discs D'.

At the same time, the cam 160 moves the cam 270 to the right in FIG. 3 so that the pin 281 of the clamper holder 280 and the pin 291 of the servo device 290 are moved by cam grooves 271 and 272, thereby clamping the disc D carried by the carrying arm 250. Thus, the disc D is reproduced by the reproducing device 300.

In order to return the disc D to the disc holder 120, the above described operation is reversely performed. The operation is described hereinafter.

When the returning of the disc D is demanded, the loading motor 151 is reversely operated. The cam 270 is moved to the left in FIG. 3, so that the clamper holder 280 and the servo device 290 are removed from the disc D.

The driving cam 160 is also reversely rotated, so that the pin 161 of the cam moves to the straight portion 172b of the cam groove 172 (FIG. 15e). Accordingly, the carrying arm 250 is lowered, and the engaging portions 252a and 252b engage the periphery of the disc D. The driving arm 170 is rotated in the clockwise direction as shown in FIGS. 15c and 15b, so that the disc D is removed from the reproducing device 300 and mounted on the bottom 312 of the groove 311 as shown in FIG. 9.

On the other hand, the guide portion 255 is always inserted between the discs D' as shown in FIGS. 9 to 11 during also the reproducing period. Therefore, the disc D can be exactly inserted between the discs D'. In addition, the inclined portions 253 of the carrying arm 250 are inserted between the discs D' (FIG. 9) to further expand the space there-between. Thus, the insertion of the disc D is more ensured.

The disc D is moved toward the disc holder 120, and the guide portion 255 is inserted in the groove 195 of the pressure plate 190. Thus, the carrying arm 250 is ensurely positioned. Thereafter, the disc D is exactly returned to the disc holder 120 (FIG. 8).

Figure 7:
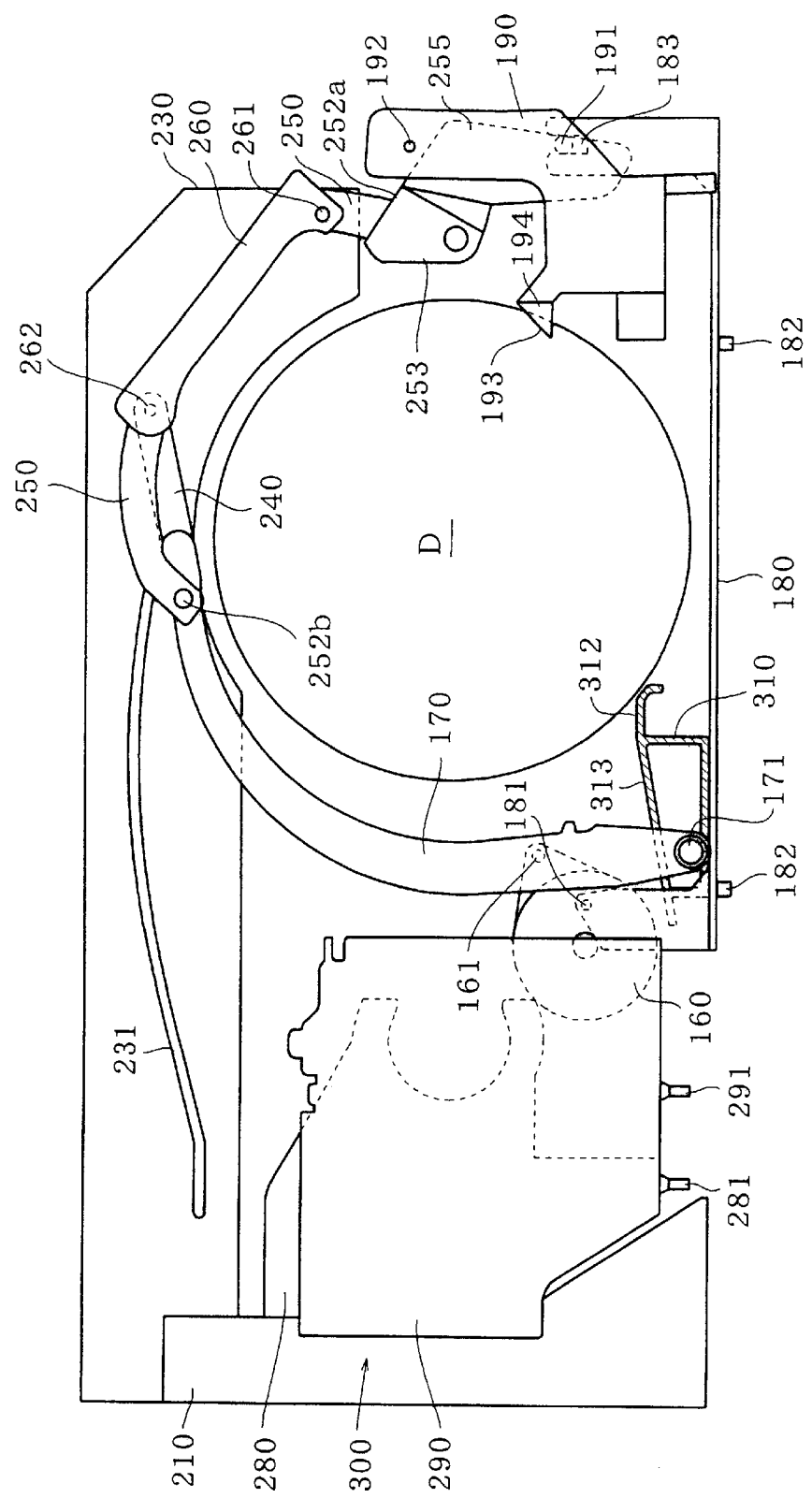

When the disc returns to the disc holder 120, the engaging portions 252a and 252b are removed from the periphery of the disc as shown in FIG. 7, and the operation of the carrying arm 250 stops.

The slide plate 180 is moved to the right by the cam 160. The movement of the slide plate 180 causes the pressure plate 190 to rotate in the counterclockwise direction by the engagement of the pin 191 with the groove 183, so that the pressure plate 190 is removed from the discs D and D' and from the disc holder 120 to release the disc holder. Finally motor 151 stops to complete the reproduction of the disc D.

The second embodiment of the present invention will be described hereinafter with reference to FIGS. 16 to 24. The parts similar to the parts of the first embodiment are identified by the same reference numerals as the first embodiment.

Figure 19:
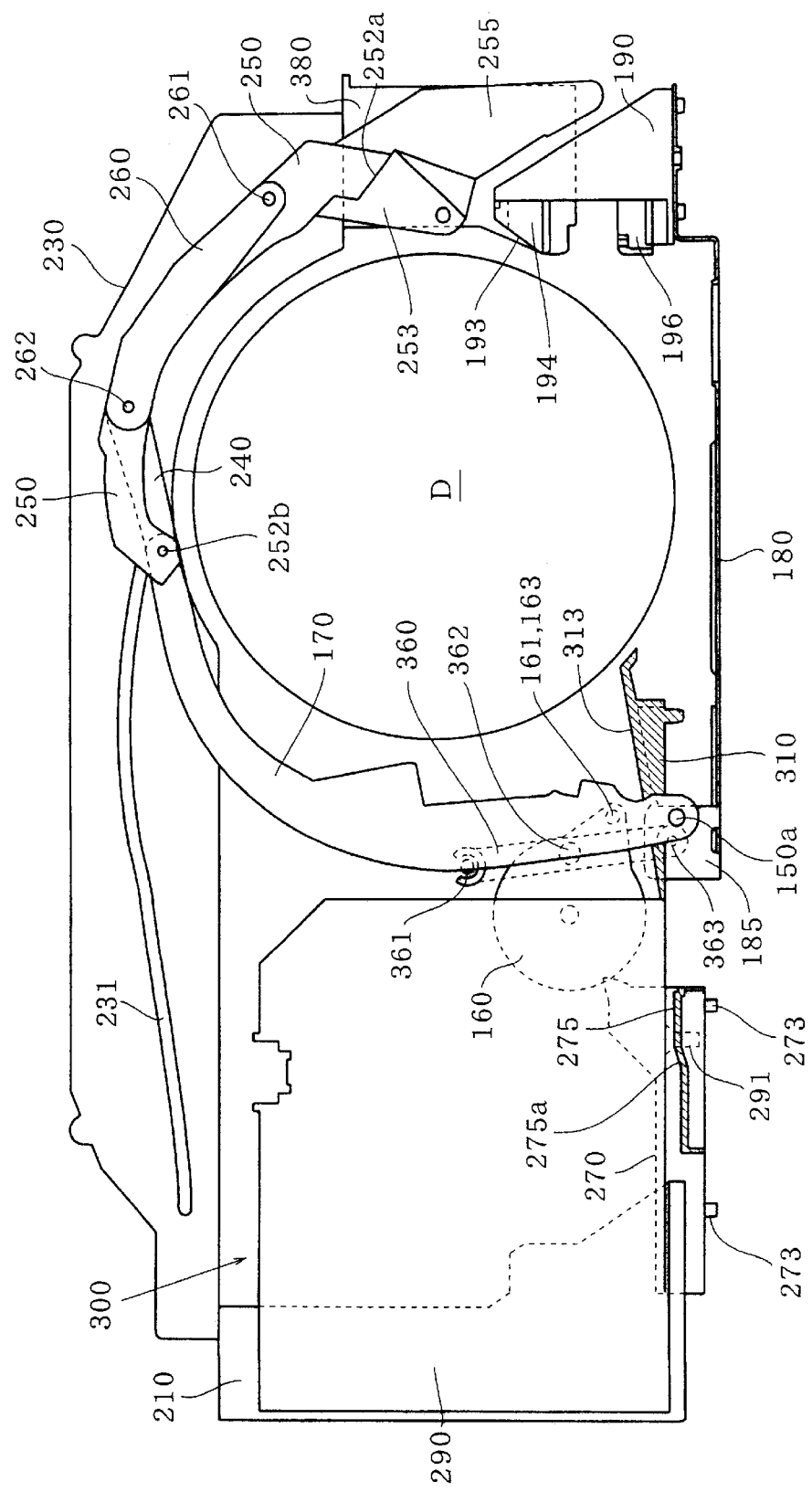
FIGS. 19 to 24 are side views showing operation of the carrying device.

On a rack base 110, a gear drive portion 140 is provided. A pin 161 of a drive cam 160 engages with a cam groove of a driving arm 170 (FIG. 19). The driving arm 170 is urged by a spring (not shown) in the counter clockwise direction about a pivot 150a.

A pin 163 opposite to the pin 161 is slidably engaged with a groove 274 (FIG. 16) of a driving cam 270 to reciprocate the cam.

A circular groove 162 (FIG. 22) formed on the opposite side of the cam 160 is engaged with a pin 362.

A slide plate 180 is slidably mounted on the rack base 110. A guide pin 113 on the rack base 110 is slidablely engaged with a groove 184.

On an end of the slide plate 180, a pressure plate 190 is securely mounted. On one of sides of the pressure plate 190, a groove 193 is provided for gripping the disc D, and a pair of inclined portions 194 are provided so as to be inserted between the disc D and adjacent discs D'. A fixing member 196 (FIG. 19) is provided on the pressure plate 190 for fixing the disc holder 120 (FIG. 1).

On the other end of the slide plate 180, a vertically bent end plate 185 is formed. A moving pin 363 of a link 360 (FIG. 19) is engaged.

The link 360 has a pivot 361 at an upper end thereof, and the pivot is engaged with a hole 150b of a gear holder 150. An engage pin 362 is secured to the link 360 and engaged with a hole 150c and with a spiral groove 162 of the driving cam 160 which is pivotally mounted on the gear holder 150 by a pivot 150d.

The pin 363 at the lower end of the link 360 is slidably engaged with a groove 186 formed in the side portion 185 of the slide plate 180.

Therefore, the rotation of the driving cam 160 causes the slide plate 180 to reciprocate through the link 360.

A driving cam 270 is slidably mounted on the rack base 110 by engaging two pins 273 with a straight groove formed in the rack base 110.

A vertical groove 274 (FIG. 22) is provided on a projected member on the cam 270, and the pin 163 enters the groove 274 so as to reciprocate the cam 270. The groove 274 has a wide opening at the upper end thereof so as to easily insert the pin 163.

On the cam 270, a disc holding portion 275 having an incline 275a is provided for temporarily hold the disc D until the disc is cramped in a reproducing device 300.

Figure 18:
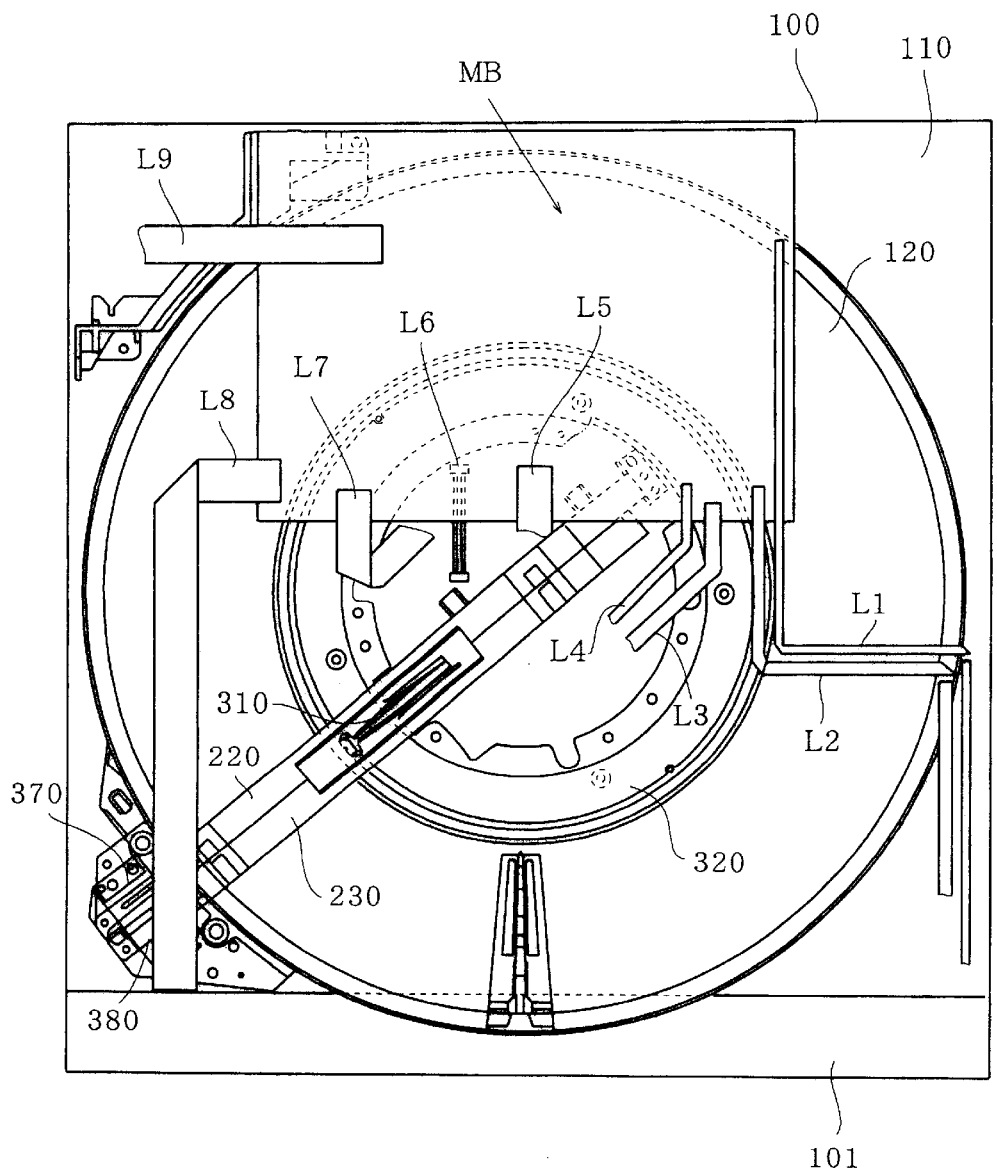
FIG. 18 is a plan view of the second embodiment.

Referring to FIG. 18, a main board MB mounting a CPV and others is mounted in a case 100 above a guide 220 and a guide 230. By the disposition of the main board MB, a disc holder 120 can be fully disposed in the case 100.

On the main board MB, a plurality of wires L1 to L9 are provided. The wire L1 is provided for a headphone, L2 is for a hood opening switch. The wire L3 is a disc load control line, L4 is a LED control line, L5 is a pickup control line, L6 is for spindle motor, L7 is for select control, L8 is for control board, and L9 is for power board.

In operation, the cam 160 (FIG. 19) is rotated in the counterclockwise direction to rotate the link 360 (FIG. 23) in the clockwise direction, thereby moving the slide plate 180 to the left. The groove 193 and side surface 194 are inserted in the desired disc D and the spaces between the discs D and D' to expand the spaces.

Figure 20:
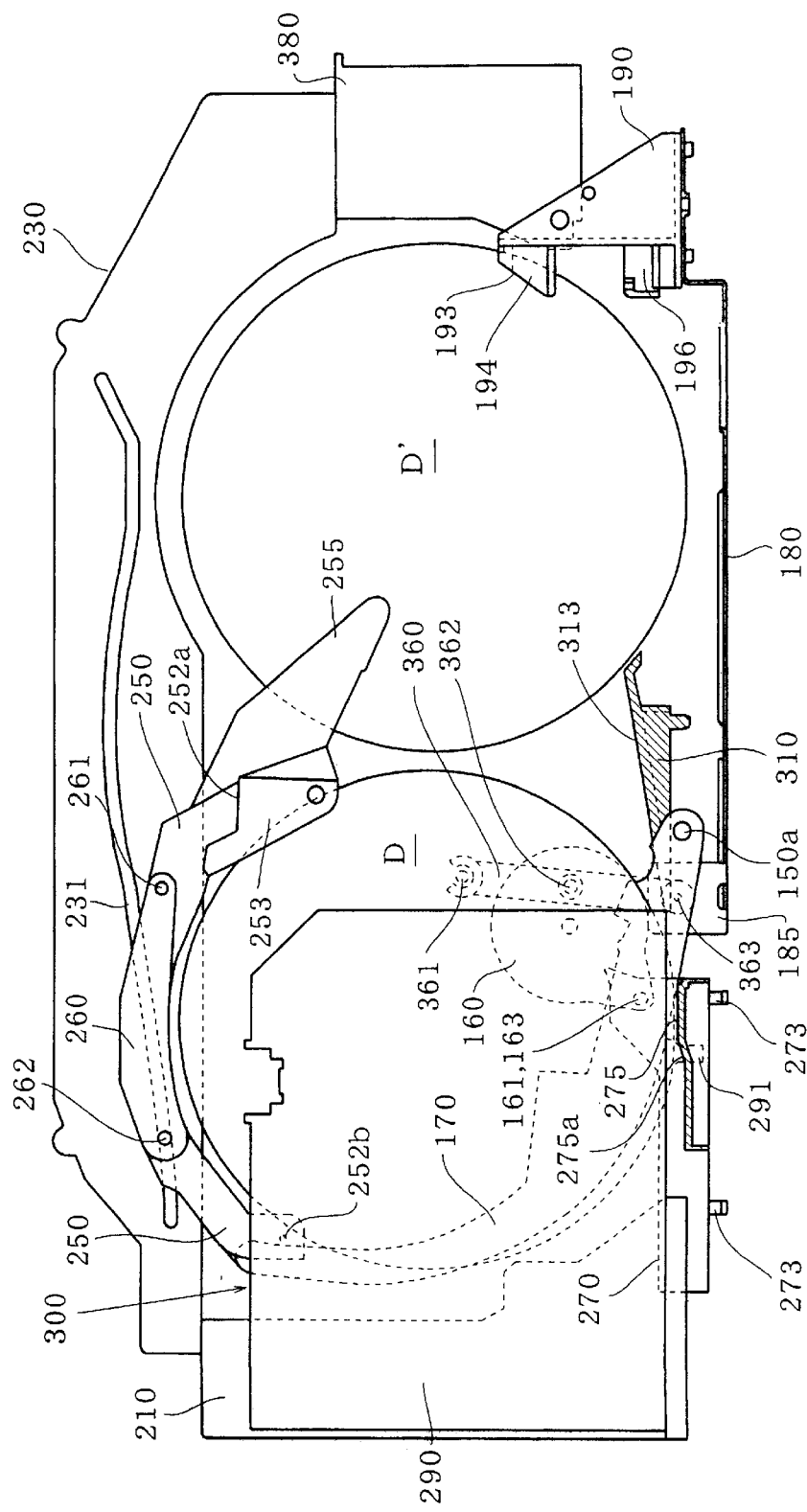

Thereafter, the driving arm 170 is rotated in the counterclockwise direction, so that the groove 193 and the side surfaces 194 are engaged with the disc D and inserted in the spaces between the disc D and D'. The engaging portions 252a and 252b engage with the periphery of the disc D to draw the disc from the disc holder 120. At that time, the guide portion 255 is inserted in the guide groove formed by guide portions 380 and 370 (FIG. 18). The disc D is rolled on the inclined portion 313. Then, the cam 270 is moved to the right by the pin 163 engaged with the groove 274, so that the disc D is mounted on the disc holding portion 275 of the cam 270 (FIG. 20). Furthermore, the disc D is moved to the left and inserted in the reproducing device 300.

Figure 21:
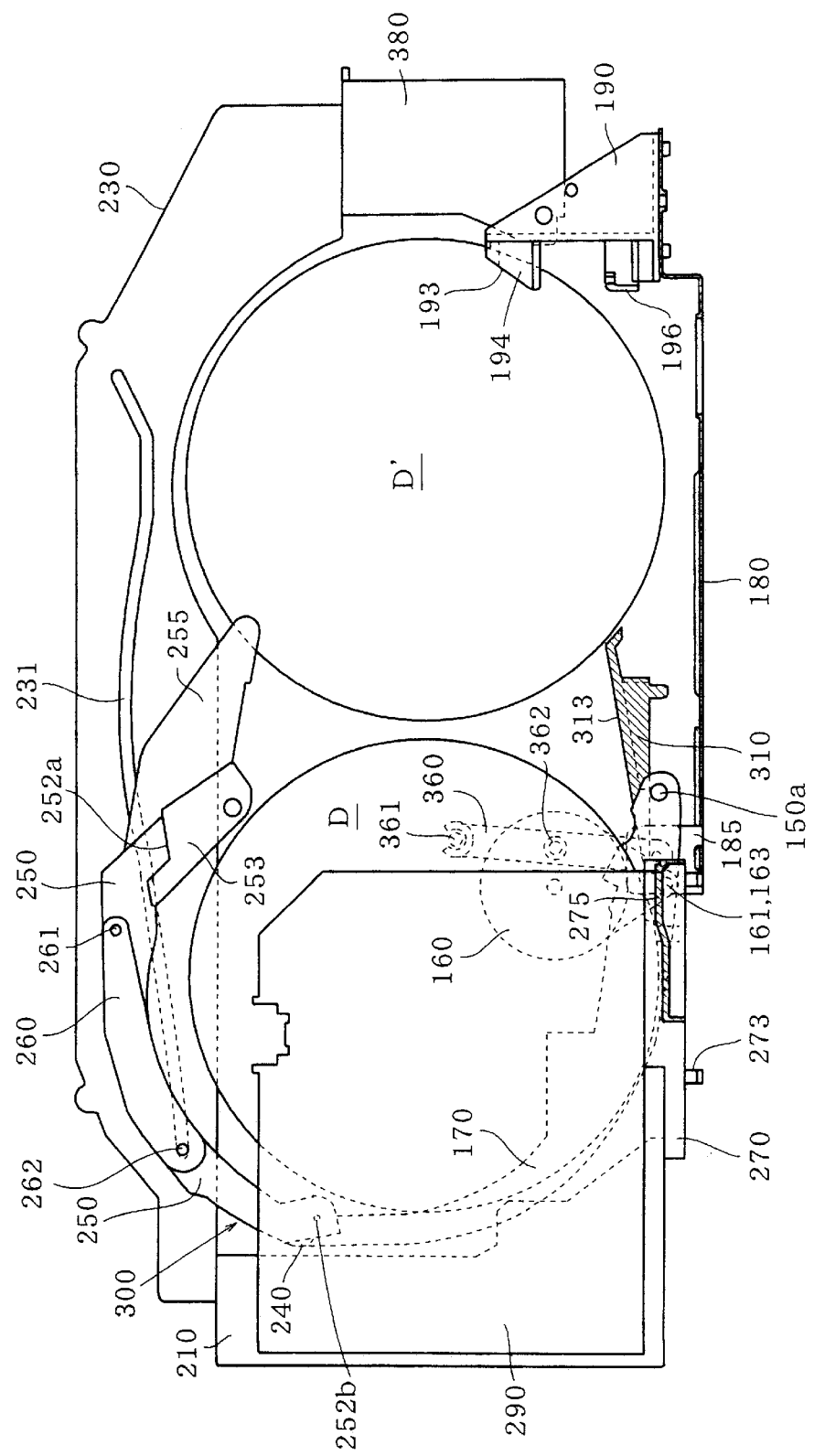
Figure 22:
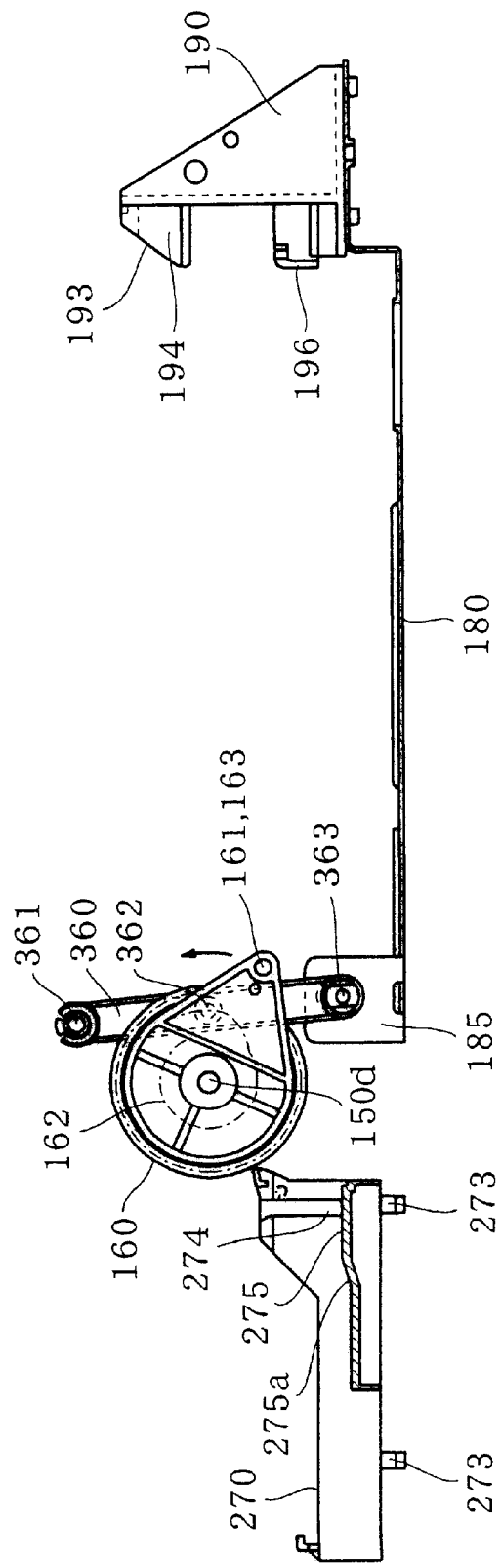
Figure 23:
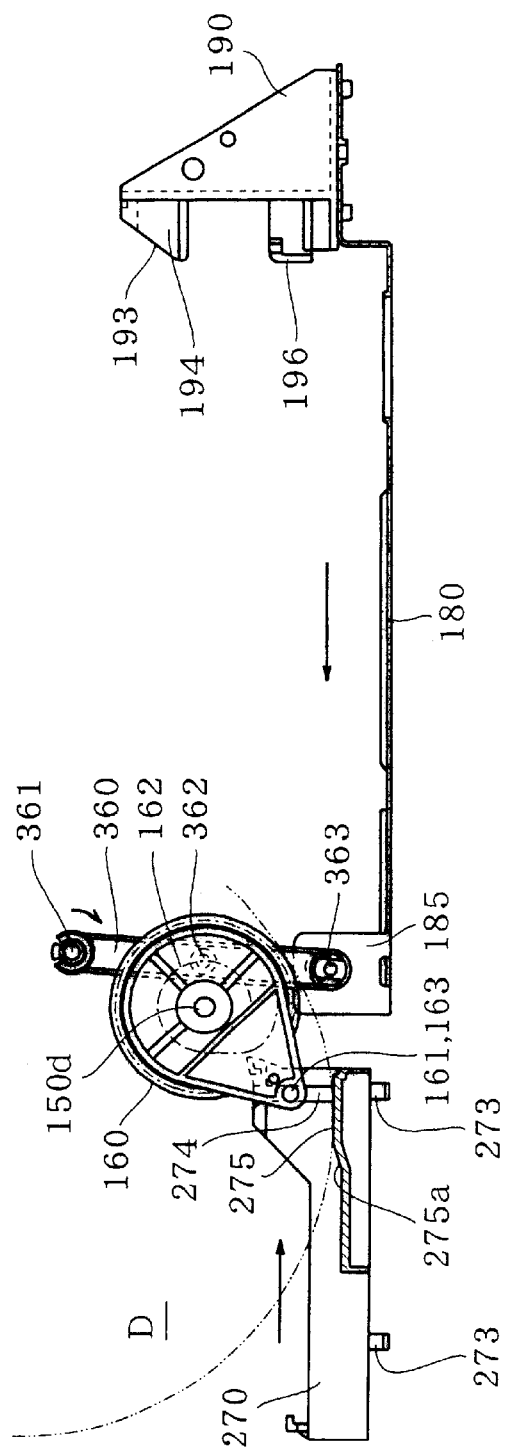
Figure 24:
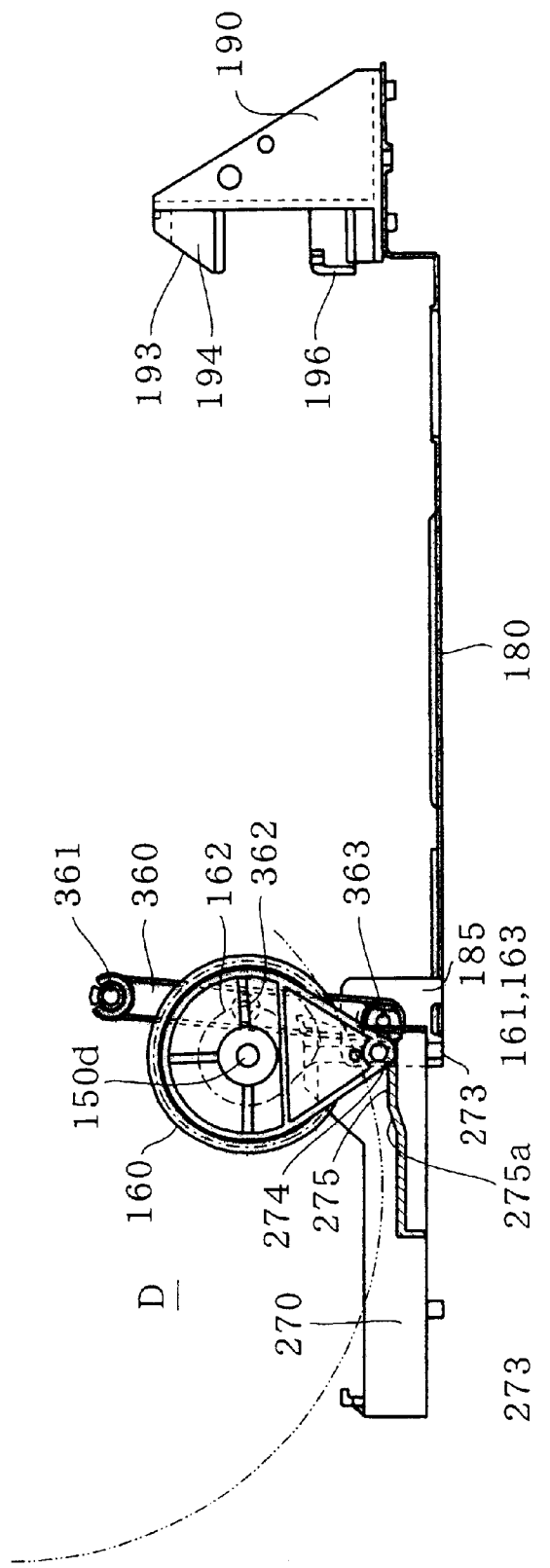
Figure 25:
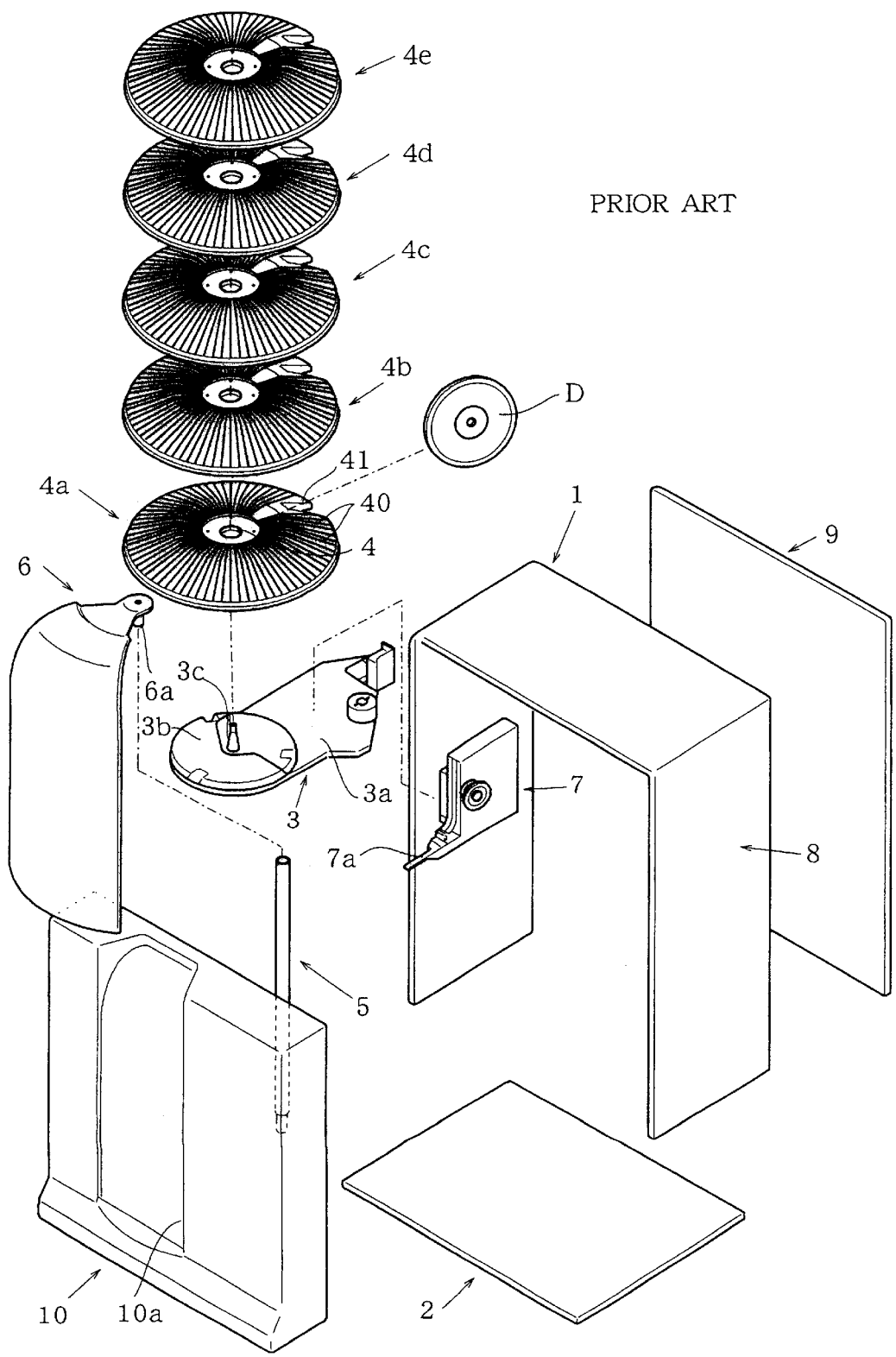
FIG. 25 is a perspective view showing a conventional device.
Figure 26:
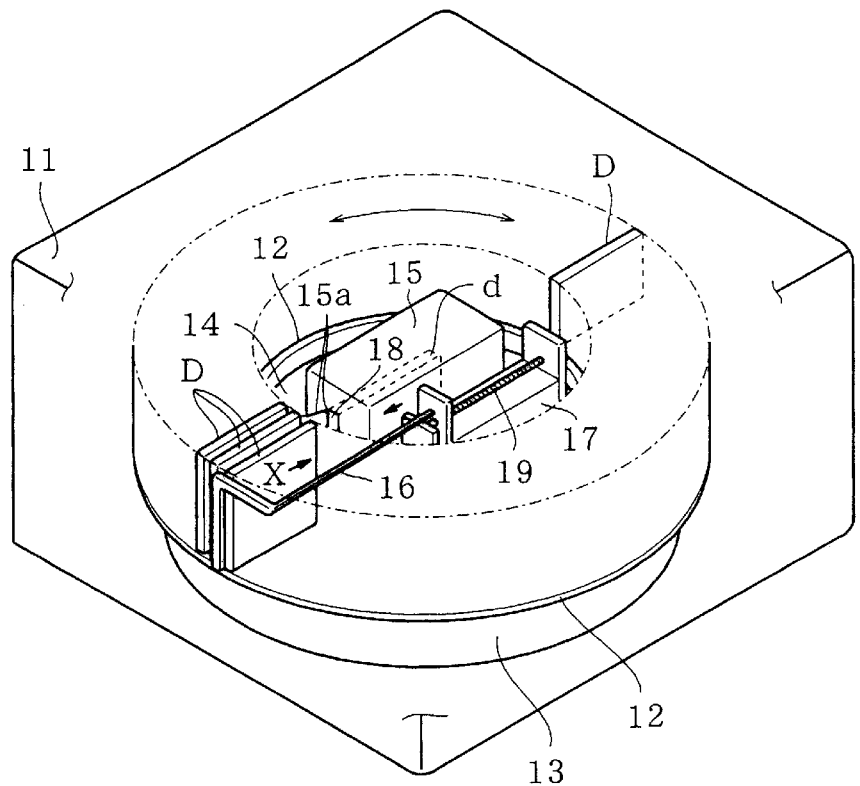
FIG. 26 is a perspective view of another conventional device.
Figure 27:
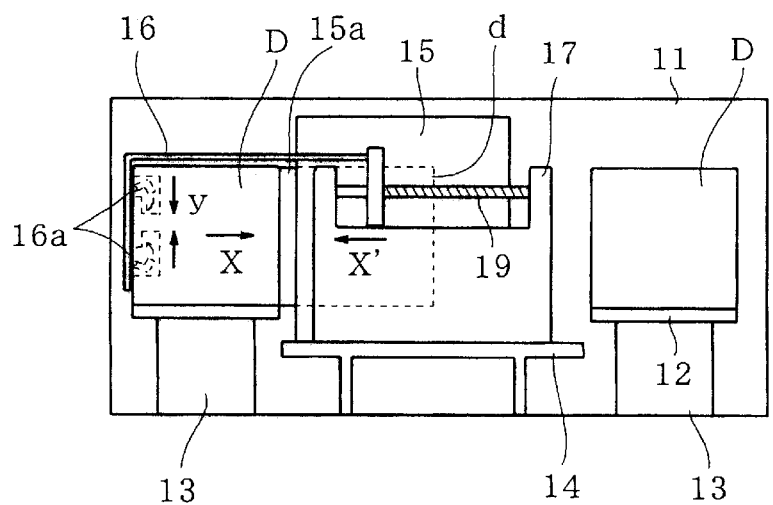
FIG. 27 is a sectional view of the device.

The engaging portions 252a and 252b are removed from the disc D as shown in FIG. 21, and the guide portion 255 of the carrying arm 25 remains in the spaces between the discs D and D'.

The cam 270 is further moved to the right to operate a clamper holder and servo mechanism by guide groove 271 and 272.

The returning operation of the disc D is carried out in the reverse order of the loading operation.

While the invention has been described in conjunction with preferred specific embodiment thereof, it will be understood that this description is intended to illustrate and not limit the scope of the invention, which is defined by the following claims.

What is claimed is:

1. A system for reproducing a recorded disc comprising:
   a disc holder for holding a plurality of discs;
   a reproducing device for reproducing a desired disc;
   a carrying device for carrying the desired disc between the disc holder and the reproducing device;
   an engaging section of the carrying device slidably engaging an outer peripheral edge of the desired disc;
   a guide section of the carrying device for accurately positioning the carrying device with the desired disc disposed on the disc holder, and
   a pair of inclined surfaces on the engaging section for slidably engaging outer peripheral edges of adjacent discs on both sides of the desired disc for increasing a separation of adjacent discs from the desired disc.

2. The system according to claim 1, wherein each of the inclined surfaces only moves along an outer peripheral portion of a corresponding one of the adjacent discs.

3. The system according to claim 1, wherein the disc holder is annularly formed, and the reproducing device is disposed at a central portion of an inside of the annular disc holder.

4. The system according to claim 1, wherein the moving passage of the carrying device has a substantially arc-shaped locus.

5. A system for reproducing a recorded disc comprising:

a rack base;

a disc holder for holding a plurality of discs;

a reproducing device for reproducing a desired disc;

an insertion unit disposed on the rack base that is inserted into and expands a space between discs adjacent to each side of the desired disc included in the disc holder; and a carrying device that is inserted into the space between the adjacent discs and carries the desired disc out from the disc holder, wherein said carrying device is inserted into the space between the adjacent discs after the insertion unit is inserted into the space between the adjacent discs, wherein said carrying device carries the desired disc after the insertion unit is inserted into the space between the adjacent discs.

6. A system for reproducing a recorded disc comprising:

a disc holder for holding a plurality of discs;

a reproducing device for reproducing a desired disc; an insertion unit that is inserted into and expands a space between discs adjacent to each side of the desired disc included in the disc holder; and a carrying device for carrying the desired disc out from the disc holder after the insertion unit is inserted into the space between the adjacent discs, wherein the insertion unit and the carrying device are separately formed from each other, and wherein the insertion unit stays between the adjacent discs while the desired disc is being reproduced and until the desired disc returns to the disc holder.

7. The system according to claim 5, wherein the carrying device is inserted into the expanded space between the adjacent discs for carrying the desired disc between the disc holder and the reproducing device by slidably engaging an outer peripheral edge of the desired disc.

8. A system for reproducing a recorded disc comprising:

a disc holder for holding a plurality of discs;

a reproducing device for reproducing a desired disc;

a disc guide disposed between the disc holder and reproducing device for guiding the desired disc therebetween;

a carrying device that slidably engages an outer peripheral edge of the desired disc and rolls the desired disc over the disc guide from the disc holder to the reproducing device; and a pair of inclined surfaces on the carrying device for increasing a separation of adjacent discs on both sides of the desired disc from the desired disc.

9. The system according to claim 8, wherein the disc guide comprises a groove, a bottom, and an inclined portion adjacent the bottom, wherein the groove is configured to permit the desired disc to be inserted therein and the bottom is adapted to be engaged with the desired disc.

10. The system according to claim 9, wherein the desired disc is rolled on the bottom and inclined portion of the disc guide while being loaded onto the reproducing device.

11. A system for reproducing a recorded disc comprising:

a rack base;

a disc holder for holding a plurality of discs;

a reproducing device for reproducing a desired disc;

a disc guide disposed between the disc holder and reproducing device for guiding the desired disc therebetween;

an insertion unit disposed on the rack base that is inserted into and expands a space between discs adjacent to each side of the desired disc held by the disc holder; and a carrying device that slidably engages an outer peripheral edge of the desired disc and rolls the desired disc over the disc guide from the disc holder to the reproducing device after the insertion unit has been inserted into and expanded the space between the adjacent discs.

* * * * *